(12) United States Patent
Lawrence et al.

(10) Patent No.: US 8,514,194 B2
(45) Date of Patent: Aug. 20, 2013

(54) TOUCH SENSITIVE HOLOGRAPHIC DISPLAYS

(75) Inventors: Nicholas A. Lawrence, Cambridge (GB); Paul R. Routley, Cambridge (GB); Adrian James Cable, Cambridge (GB)

(73) Assignee: Light Blue Optics Ltd, Cambridge (GB)

( * ) Notice: Subject to any disclaimer, the term of this patent is extended or adjusted under 35 U.S.C. 154(b) by 0 days.

(21) Appl. No.: 13/130,738

(22) PCT Filed: Dec. 3, 2009

(86) PCT No.: PCT/GB2009/051638
§ 371 (c)(1), (2), (4) Date: Jul. 1, 2011

(87) PCT Pub. No.: WO2010/073024
PCT Pub. Date: Jul. 1, 2010

(65) Prior Publication Data
US 2011/0251905 A1    Oct. 13, 2011

(30) Foreign Application Priority Data
Dec. 24, 2008   (GB) .................................. 0823457.7

(51) Int. Cl.
*G06F 3/041*  (2006.01)
(52) U.S. Cl.
USPC ................ 345/173; 345/175; 705/15; 705/16
(58) Field of Classification Search
None
See application file for complete search history.

(56) References Cited

U.S. PATENT DOCUMENTS

| 4,827,085 | A  | * | 5/1989 | Yaniv et al. ................. 345/174 |
| 6,281,878 | B1 |   | 8/2001 | Montellese |
| 6,323,942 | B1 |   | 11/2001 | Bamji |
| 6,367,933 | B1 | * | 4/2002 | Chen et al. .................... 353/69 |
| 6,491,400 | B1 |   | 12/2002 | Chen et al. |
| 6,567,190 | B1 | * | 5/2003 | Reele .......................... 358/474 |
| 6,650,318 | B1 |   | 11/2003 | Arnon |

(Continued)

FOREIGN PATENT DOCUMENTS
GB    2343023    4/2000
WO    WO 02/101443    12/2002
(Continued)

OTHER PUBLICATIONS

Buckley, et al.: "Full Colour Holographic Laser Projector HUD" SID Vehicles and Photons 2008—15th Annual Sympolsium on Vehicle Displays, Oct. 17, 2008 pp. 1-5, XP007908687.

(Continued)

*Primary Examiner* — Ryan Zeender
*Assistant Examiner* — Fateh Obaid
(74) *Attorney, Agent, or Firm* — Hamilton DeSanctis & Cha

(57) ABSTRACT

We describe a touch sensitive holographic image display device for holographically projecting a touch sensitive image at an acute angle onto a surface on which the device is placed. The device includes holographic image projection optics comprising at least one coherent light source illuminating a spatial light modulator (SLM), output optics to project a hologram onto an acute angle surface, and a remote touch sensing system to remotely detect a touch of a location within or adjacent to the holographically displayed image. A control system is configured to provide data defining an image for display, to receive detected touch data, and to control the device responsive to remote detection of a touch of a the displayed image.

31 Claims, 13 Drawing Sheets

(56) References Cited

U.S. PATENT DOCUMENTS

| | | | |
|---|---|---|---|
| 7,379,619 B2 | 5/2008 | Ikeda et al. | |
| 2004/0095315 A1 | 5/2004 | Montellese | |
| 2005/0156952 A1* | 7/2005 | Orner et al. | 345/905 |
| 2006/0244720 A1* | 11/2006 | Tracy | 345/156 |
| 2007/0222760 A1 | 9/2007 | Lieberman et al. | |
| 2010/0142016 A1 | 6/2010 | Cable et al. | |
| 2011/0251905 A1* | 10/2011 | Lawrence et al. | 705/15 |

FOREIGN PATENT DOCUMENTS

| | | |
|---|---|---|
| WO | WO 2005/059660 | 6/2005 |
| WO | WO 2006/108443 | 10/2006 |
| WO | WO 2006/134398 | 12/2006 |
| WO | WO 2007/031797 | 3/2007 |
| WO | WO 2007/110668 | 10/2007 |
| WO | WO 2007/141567 | 12/2007 |
| WO | WO 2008/038275 | 4/2008 |
| WO | WO 2008/075096 | 6/2008 |
| WO | WO 2008/120015 | 10/2008 |
| WO | WO 2008/146098 | 12/2008 |
| WO | WO 2010/073024 | 7/2010 |

OTHER PUBLICATIONS

Buckley E.: "Holographic laser projection technology" S I D International Symposium. Digest of Technical Papers, Society for Information Display, US, vol. 39, No. 2, May 23, 2008.

Gerchberg et al., "A practical algorithm for the determination of phase from image and diffraction plane pictures" Optik 35, 237-246 (1972).

Seldowitz, et al., "Synthesis of digital holograms by direct binary search" Appl. Opt. 26, 2788-2798 (1987).

Dames, et al., "Efficient optical elements to generate intensity weighted spot arrays: design and fabrication," Appl. Opt. 30, 2685-2691 (1991).

Wu, et al., "Iterative procedure for improved computer-generated-hologram reconstruction," App;. Opt. 32, 5135—(1993).

Gil- Leyva, et al. "Aberration correction in an adaptive free-space optical interconnect with an error diffusion algorithm", Applied Optics, vol. 45, No. 16, p. 3782-3792, 1 J.

* cited by examiner

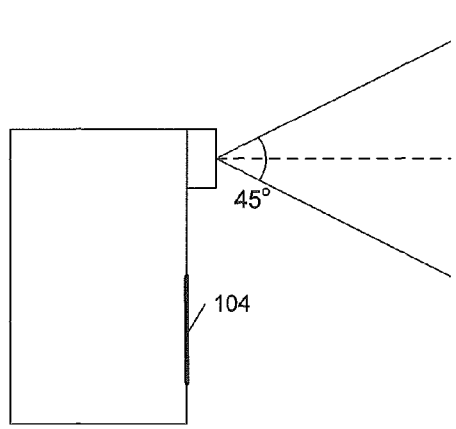
Figure 1a
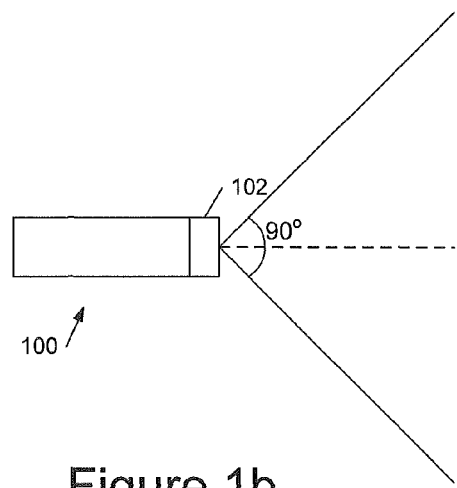
Figure 1b
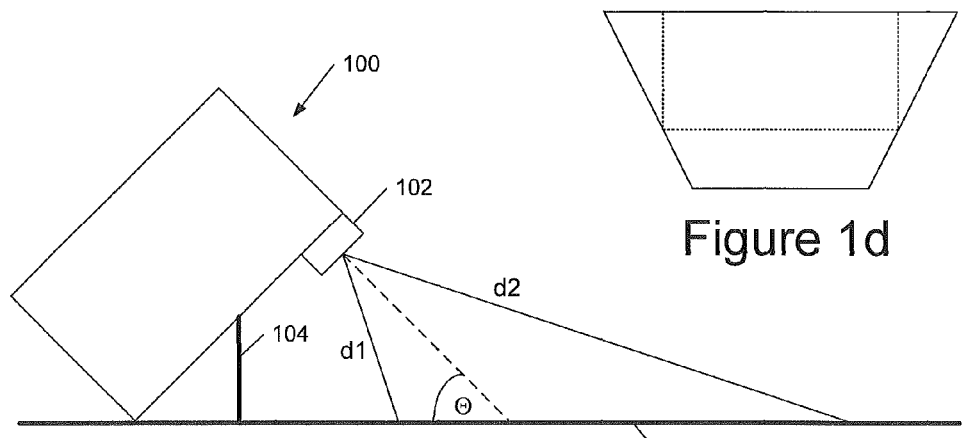
Figure 1d
Figure 1c
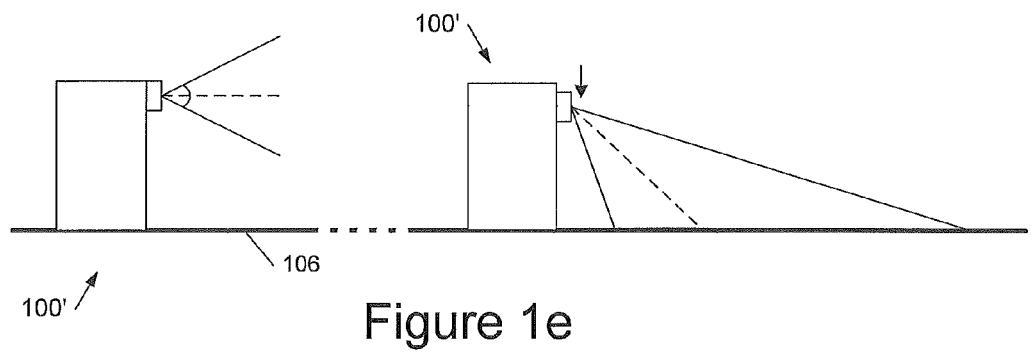
Figure 1e

TOUCH SENSITIVE HOLOGRAPHIC DISPLAYS

CROSS REFERENCE TO RELATED APPLICATION

This application claims priority to PCT Application No. PCT/GB2009/051638 entitled "Touch Sensitive Holographic Displays" and filed Dec. 3, 2009, which itself claims priority to Great Britain Patent Application No. GB0823457.7 filed Dec. 24, 2008. The entirety of each of the aforementioned applications is incorporated herein by reference for all purposes.

BACKGROUND OF THE INVENTION

This invention relates to touch sensitive holographic image display systems, in particular to systems which are able to project onto a surface at an acute angle. The invention also provides related methods and corresponding processor control code.

We have previously described techniques for displaying an image holographically—see, for example, WO 2005/059660 (Noise Suppression Using One Step Phase Retrieval), WO 2006/134398 (Hardware for OSPR), WO 2007/031797 (Adaptive Noise Cancellation Techniques), WO 2007/110668 (Lens Encoding), and WO 2007/141567 (Colour Image Display). These are all hereby incorporated by reference in their entirety.

Projecting downwards and outwards onto a flat surface such as a tabletop entails projecting at an acute angle onto the display surface (taking this as the angle between the centre of the output of the projection optics and the middle of the displayed image—this angle, to a line in the surface, is less that 90°). We conveniently refer to this as "table down projection". Table down projection is not readily achievable by conventional image display techniques; scanning image display systems have a narrow throw angle and thus find it difficult to achieve a useful image size whilst projection systems, especially those based on LEDs (light emitting diodes) which have a wide light output angle, find it difficult to achieve a useful depth of field. Moreover table down projection can often involve very substantial distortion of an image which can result in inefficient use of the area of an image display device, resulting in major reductions in image brightness and overall system efficiency. Background information relating to compensating for keystone distortion in an LCD projector can be found in U.S. Pat. No. 6,367,933 (WO00/21282); further background prior art can be found in: WO02/101443; U.S. Pat. Nos. 6,491,400; 7,379,619; US2004/0095315; U.S. Pat. Nos. 6,281,878; and 6,031,519.

The inventors have recognized that holographic image display techniques can be used to address these problems to provide a wide throw angle, long depth of field, and very substantial distortion correction without substantial loss of brightness/efficiency. These techniques are described in our UK Patent Application number GB0822336.4 filed on 8 December 2008 hereby incorporated by reference in its entirety.

Background prior art relating to touchsensing can be found, for example, in patent applications filed by Lumio Inc (such as WO2008/038275) and VKB Inc (such as US2007/222760), as well as in patent/applications filed by Canesta Inc (for example U.S. Pat. No. 6,323,942), and patent applications filed by Sensitive Object (such as WO2006/108443 and WO2008/146098).

Hence, for at least the aforementioned reasons, there exists a need in the art for advanced systems and methods for display.

BRIEF DESCRIPTION OF THE DRAWINGS

The invention will further be described, by way of example, with reference to the accompanying drawings, in which:

FIGS. 1a to 1e show respectively, a side view and a view from above of a holographic table-down projector, the projector in its table-down configuration, keystone distortion of a projected image, and a second embodiment of a holographic table-down projector having forward-projecting and table-down projecting configurations selected by moving an output lens;

FIGS. 9a and 9b show respectively, an embodiment of a touch sensitive holographic image display device according to an embodiment of the invention, and a block diagram of the device of FIG. 9a.

BRIEF SUMMARY OF THE INVENTION

Figure 2:
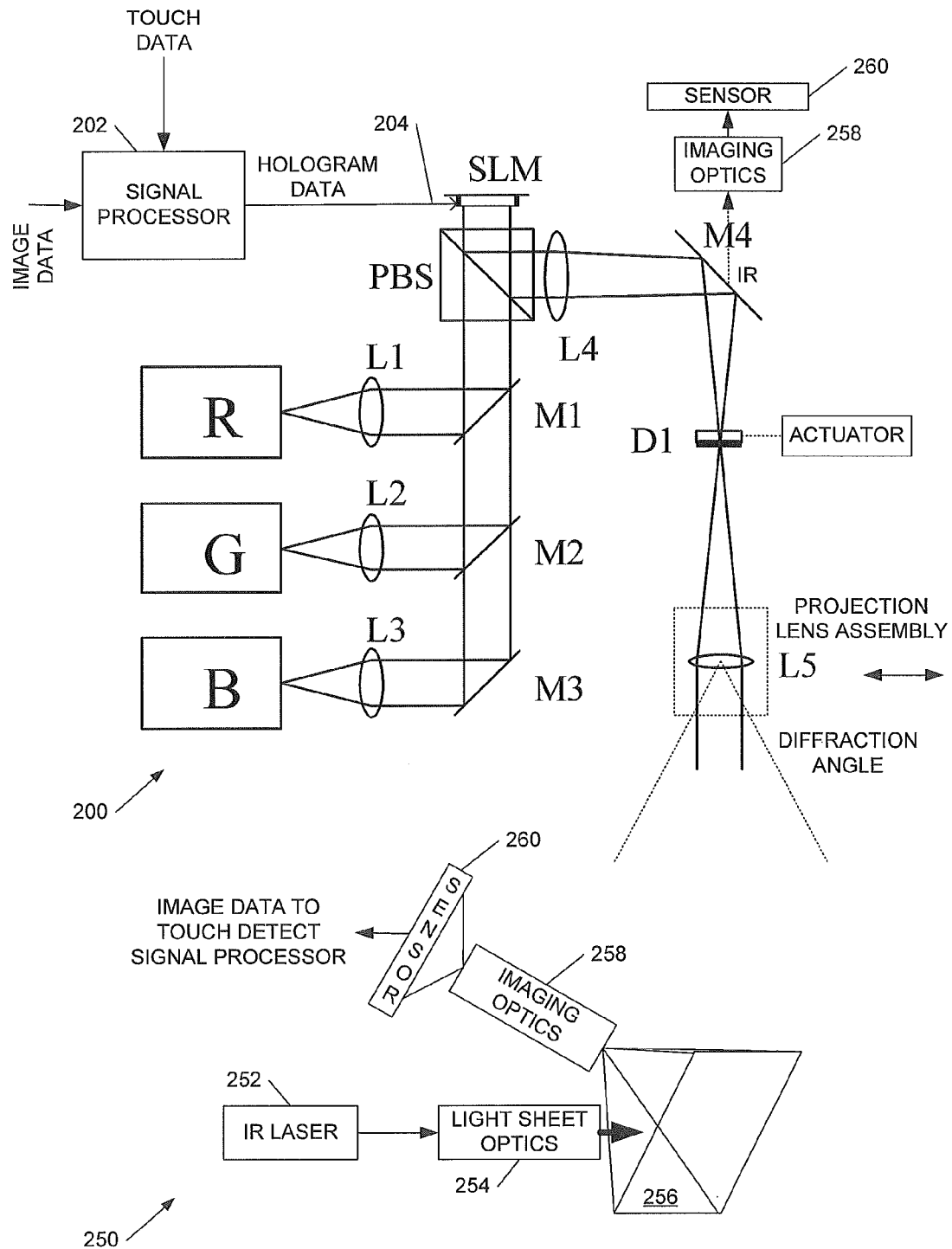
FIG. 2 shows an example optical configuration of a touch sensitive holographic display device.

This invention relates to touch sensitive holographic image display systems, in particular to systems which are able to project onto a surface at an acute angle. The invention also provides related methods and corresponding processor control code.

Table-Down Projection

We have previously described a holographic image projection system for projecting an image at an acute angle onto a surface, the system comprising: a spatial light modulator (SLM) to display a hologram; an illumination system to illuminate said displayed hologram; projection optics to project light from said illuminated displayed hologram onto said surface at an acute angle form said image; and a processor having an input to receive input image data for display and an output to provide hologram data for said spatial light modulator, and wherein said processor is configured to: input image data; convert said input image data to target image data; generate from said target image data hologram data for display as a hologram on said spatial light modulator to reproduce a target image corresponding to said target image data; and output said hologram data for said spatial light modulator; and wherein said target image is distorted to compensate for said projection of said hologram at an acute angle to form said image.

In embodiments of the system, because diffraction is employed light from the entire illuminated area of the hologram can be directed into the distorted target image field. Moreover, the displayed image is substantially focus-free; that is the focus of the displayed image does not substantially depend upon the distance from the holographic image projection system to the display surface. A demagnifying optical system may be employed to increase the divergence of the modulated light to form the displayed image, thus allowing an image of a useful size to be displayed at a practical distance.

The field of the displayed image suffers from keystone distortion, the trapezoidal distortion of a nominally rectangular input image field caused by projection onto a surface at an angle which is not perpendicular to the axis of the output optics. Thus the holographic image projection system internally generates a target image to which the inverse distortion has been applied so that when this target image is projected holographically the keystone distortion is compensated. The target image is the image to which a holographic transform is applied to generate hologram data for display on the SLM. Thus in some preferred embodiments the system also includes non-volatile memory storing mapping data for mapping between the input image and the target image.

To convert from the input image to the target image either forward or reverse mapping may be employed, but preferably the latter, in which pixels of the target image are mapped to pixels of the input image, a value for a pixel of the target image then being a assigned based upon lookup of the value of the corresponding pixel in the input image. Thus in some preferred embodiments the trapezoidal shape of the target image field is located in a larger, for example rectangular target image (memory) space and then each pixel of the target image field is mapped back to a pixel of the (undistorted) input image and this mapping is then used to provide values for the pixels of the target image field. This is preferable to a forward mapping from the input image field to the distorted target image field for reasons which are explained below. In either case, however, in some preferred embodiments the holographic transform is only applied to the distorted, generally trapezoidal target image field rather than to the entire (rectangular) target image memory space, to avoid performing unnecessary calculations.

Where reverse mapping as described above, is employed preferably compensation is also applied for variations in per unit area brightness of the projected image due to the acute angle projection. Thus while diffraction from a given pixel of the SLM will contribute to substantially the entire displayed hologram, nonetheless the diffracted light from this pixel will be distorted resulting in more illumination per unit area at the short-side end of the trapezoid as compared with the long-side end of the trapezoid. Thus in preferred embodiments an amplitude or intensity scale factor is applied the value of which depends upon the location (in two dimensions) of a pixel in the target image space. This amplitude/intensity compensation may be derived from a stored amplitude/intensity map determined, for example, by a calibration procedure or it may comprise one or a product of partial derivatives of a mapping function from the input image to the anti-distorted target image. Thus, broadly speaking, the amplitude/intensity correction may be dependent on a value indicating what change of area in the original, input image results from a change of area in the anti-distorted target image space (at the corresponding position) by the same amount.

As mentioned above, rather than a reverse mapping a forward mapping from the input image space to the distorted target image space may alternatively be employed. This is in general less preferable because such a mapping can leave holes in the (anti-) distorted target image where, in effect, the target image is stretched. Thus mapping pixels of the input image to pixels of the target image may not populate all the pixels of the target image with values. One approach to address this issue is to map a pixel of the input image to an extended region of the target image, for example, a regular or irregular extended spot. In this case a single pixel of the input image may map to a plurality of pixels of the target image. Alternatively once pixel values of the target image have been populated using pixels of the input image, pixels of the target image which remain unpopulated may be given values by interpolation between pixels of the target image populated with pixel values. Where a single input image pixel is mapped to an extended region of the target image, these extended regions or spots may overlap in the target image, in which case the value of a target image pixel may be determined by combining more particularly summing, the overlapping values (so that multiple input image pixels may contribute to the value of a single target image pixel). With this approach compensation for per unit area brightness variation is achieved automatically by the summing of the values of the extended spots where these spots overlap in the target image field.

Preferred embodiments of the holographic image projection system provide a multi-color, more particularly a full color display. Thus red, green and blue laser illumination of the SLM may be employed, time multiplexed to display three color planes of the input image in turn. However, since the projection system operates by diffraction, the blue light diverges less than the red light and thus in preferred embodiments the target image also has three color planes in which a different scaling is employed for each color, to compensate for the differing sizes of the projected color image planes. More particularly, since the red light diverges most, the target image field of the red color plane is the smallest target image field of the three target image planes (since the target image has "anti-distortion" applied). In general the size of the target image field for a color is inversely proportional to the wavelength of light used for that color. In some preferred embodiments, however, rather than a simple scaling by wavelength being applied the distortion (more correctly anti-distortion) of each color image plane may be mapped to a corresponding color plane of the target image field using a calibration process which corrects for chromatic aberration within the projection system such as chromatic aberration within the projection optics, chromatic aberration caused by slight misalignment between rays for different colors within the optics, and the light.

The holographic techniques employed in preferred embodiments of the projector facilitate miniaturisation of the projector. These techniques also facilitate handling of extreme distortion caused by projection onto a surface on which the projector is placed, this extreme distortion resulting from the geometry illustrated in later FIG 1c in combination with the small size of the projector. Thus in some preferred embodiments the surface onto which the image is projected is no more than 1 m, 0.5 m, 0.3 m, 0.2 m, 0.15 m, or 0.1 m away from the output of the projection optics 102. Similarly in embodiments the distance from the output of the projection optics to the furthest edge of the displayed image is substantially greater than the distance from the output of the projection optics to the nearest edge of the displayed image, for example 50%, 100%, 150%, 200% or 250% greater. Depending upon the geometry the acute projection angle may be less than 70°, 65°, 60°, 55°, 50°, or even 45°.

The device may also provide a forward projection mode and incorporate a stand such as a bipod or tripod stand, and preferably also a sensor to automatically detect when the device is in its table-down projection configuration, automatically applying distortion compensation in response to such detection. However in some alternative arrangements rather than mechanically tilting the device, instead the projection optics may be adjusted to alter between forward and table-down projection. This could be achieved with a moveable or switchable minor, but an alternative approach employs a wide angle or fisheye lens which when translated perpendicular to the output axis of the optics may be employed to move from forward projection to table-down projection at an acute angle.

We also described a method of projecting an image onto a surface at an acute angle, the method comprising: inputting display image data defining an image for display; processing said display image data to generate target image data defining a target image for projection, wherein said target image comprises a version of said image for display distorted to compensate for projection onto said surface at said acute angle; performing a holographic transform on said target image defined by said target image data to generate hologram data for a hologram of said target image; displaying said hologram data on a spatial light modulator illuminated by at least one laser; and projecting light from said at least one laser modulated by said hologram data displayed on said spatial light modulator onto said surface at said acute angle, to reproduce a substantially undistorted version of said image on said surface.

A mapping between the input image and the anti-distorted target image may comprise either an analytical mapping, based on a mathematical function, or a numerical mapping, for example, derived from a calibration procedure or both. As previously mentioned in some preferred embodiment target image pixels are mapped to input image pixels to lookup target image pixel values. Preferably the target image is also corrected for area mapping distortion and, in a color system, preferably the different color planes are appropriately scaled so that they reproduced in the projection surface at substantially the same size.

We also described processor control code to implement the above-described method, in particular on a data carrier such as a disk, CD- or DVD-ROM, programmed memory such as read-only memory (Firmware). Code (and/or data) to implement embodiments of the invention may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog (Trade Mark) or VHDL (Very high speed integrated circuit Hardware Description Language). As the skilled person will appreciate such code and/or data may be distributed between a plurality of coupled components in communication with one another.

In preferred embodiments of the above described systems, devices and methods preferably an (AD)OSPR-type procedure is employed to generate the hologram data. Thus in preferred embodiments a single displayed image or image frame is generated using a plurality of temporal holographic subframes displayed in rapid succession such that the corresponding images average in an observer's eye to give the impression of a single, noise-reduced displayed image.

Touch Sensitive Holographic Image Display

According to a first aspect of the invention there is a provided a touch sensitive holographic image display device for holographically projecting a touch sensitive displayed image at an acute angle onto a surface on which the device is placed, the device comprising: a device data input to receive data defining an image for display;

holographic image projection optics comprising at least one coherent light source illuminating a spatial light modulator (SLM) and output optics to project modulated coherent light from said SLM onto said surface at said acute angle; and a remote touch sensing system to remotely detect a touch of a location within or adjacent to said displayed image and having a touch data output to provide detected touch data; and a control system including memory for storing said data defining said image for display and having a first input coupled to receive said data defining said image for display and a second input coupled to receive said detected touch data and having an output for driving said SLM to display hologram data on said SLM to replay said displayed image on said surface; and wherein said control system is configured to control said device responsive to remote detection of a touch of a said location within or adjacent to said displayed image.

In some embodiments the device may receive and store hologram data for display on the spatial light modulator (SLM), for example data for a set of temporal holographic subframes for display in rapid succession to provide a reduced-noise image. In other implementations the device receives image data and includes a hologram generation engine to convert the image data to one or more preferably a set of holograms, in preferred embodiments using an OSPR-type procedure. In such an arrangement the target image is distorted to compensate for projection of the hologram at an acute angle to form the displayed image.

The device may have variety of different mechanical configurations but in some preferred embodiments the device is arranged so that when it is resting on or supported by the surface, which may be a tabletop or a wall for example, the output optics, more particularly a central point of the output beam, is at a defined height from the surface. In this way the keystone distortion is effectively predetermined and thus compensation for this distortion can be built into the device, for example stored in non-volatile memory as calibration (polynomial) parameters or a calibration map.

The device may be supported on a stand but in one preferred embodiment the device has a housing with a base which rests on/against the surface, the base of the device being employed for the touch sensing. Thus in one embodiment the base may be employed for acoustic sensing; in another an infrared laser or other illumination source is built into the device to generate a sheet of light just above the hologram display area so that when the holographically displayed image is touched through this sheet of light the scattered light can be detected. In some preferred implementations the front of the device comprises a black plastic infrared transmissive window. The sheet illumination optics and a scattered light (imaging) sensor to image the display area may be positioned between the holographic output optics and the sheet illumination system to view the display area (at an acute angle). Using infrared light enables the remote touch sensing system to be concealed behind a black, it transmissive window, and the infrared light does not detract from the visual appearance of the holographically displayed image.

In some embodiments of the device the holographic image projection optics may be at least partially shared with optics of an optical remote touch sensing system, for example of the type described in the background to the invention. For example an additional "color" may be introduced into the holographic image projection optics of a color display system, by combining an infrared laser beam with red, green and blue laser beams so that they at least partially share part of an optical path through the device. Additionally or alternatively the output lens assembly may be employed to image part of the display area, for example in infrared light, for example by employing a dichroic mirror or beam splitter in the output optical path to divert incoming infrared light to a sensor, in embodiments, an imaging sensor.

As the skilled person will appreciate the signal from an imaging sensor will be keystone distorted, and in implementations substantially the same mapping employed for displaying the holographically projected image (that is compensating for distortion in this image) may be employed to compensate for distortion in the light received by an imaging sensor of an optical remote touch sensing. In this way the output of the remote optical touch imaging sensor may be processed to provide touch location data in coordinates which correspond to those of the original image displayed, for example conventional touch location data in rectangular [X,Y] coordinates.

In some alternative embodiments optical time-of-flight ranging is employed as described, for example, U.S. Pat. No. 6,323,942, or remote acoustic touch sensing may be employed, for example as described in WO2006/108443. In some embodiments of the device the control system may include a calibration routine to display a calibration image to enable the user to calibrate the remote touch sensing system to compensate for keystone distortion. This facilitates, for example, implementation of a device with a variable height of the output optics from the display surface. The skilled person will recognise that the techniques described later for mapping/calibrating the keystone distortion may be employed for this purpose.

It is generally desirable that the device should be compact and therefore in some preferred implementations the spatial light modulator is a reflective spatial light modulator and a folded optical path is employed. More particularly in embodiments the projection optics includes two antiparallel optical paths for the coherent light, one towards and one away from the reflective SLM, via a shared beamsplitter placed in front of the SLM. In embodiments, rather than tilt the entire projection optics an off-axis output lens is employed to displace the projected image outwards from the device and downwards at an acute angle towards the display surface.

In preferred embodiments of the device the projection optics is configured to form an intermediate image at an intermediate image surface (an "anti-distorted" keystone distorted version of the displayed image appears at this point). A diffuser, preferably comprising a pixellated, quantised phase diffuser is located at this intermediate image surface and an actuator is provided mechanically coupled to the diffuser, to, in operation, move the diffuser to randomise phases over pixels of the intermediate image to reduce speckle in the displayed image. Broadly speaking this arrangement generates a plurality of different (independent) speckle patterns which average within an observer's eye to reduce the perceived speckle. Preferably a pixel pitch or feature size of the diffuser is less than that of the intermediate holographically generated image.

In some implementations of the device data defining a plurality of different images is stored in a memory and the displayed image is changed as the display area is touched. It will be appreciated that there are many applications of such technology including, for example, display of photographs and/or video, allowing selection of the displayed material, and complex menu structures. In this latter case the stored data may include a set of images defining the menus to be displayed (although in other embodiments the images may be stored as holograms), and menu link data defining sensitive regions of the displayed images and image pages to which these are linked, typically other menu pages which are displayed in response to touching a touch sensitive region.

In one preferred application the device is employed as a restaurant menu display and food ordering device and includes a bidirectional communications link, for receiving data defining the menus to be displayed and, in embodiments, associated price data for displayed menu items, and for transmitting a customer order, for example back to a remote station in the kitchen. It will be appreciated that such a device may also be combined with a customer billing system, in a simple embodiment a cash register or till. Optionally the device may further comprise a card reader to read a payment card to enable the device to be employed for settling a customer's bill as well as for ordering. Embodiments of the device may also provide advertisements, games and the like for customer entertainment. In embodiments means may be provided, for example, a touch keyboard to enable a customer to identify themselves to the device and/or remote station. In this way customer-specific information may be displayed on the device, for example received from the remote station, more particularly from a non-volatile data store, to, say make suggestions, offer loyalty scheme rewards, provide tailored advertising and the like.

Thus in a related aspect the invention a restaurant menu display and food ordering device comprising a touch sensitive holographic image display device, memory storing data for a plurality of menus for display together with menu link data defining links between the menus, and price data, and further comprising a bidirectional communications link for receiving said price data and for transmitting a customer order, and a system controller configured to display selected said menus response to a said customer touching menu link regions of said displayed menus, a said menu link region being associated with said link data to define selected menu to display in response to detection of touching of a said link region, and to input an order for one or both of food and drink by detection of said customer touching one or more touch sensitive order regions of a said menu displayed by the display device, and to transmit said order to a remote computer system for output for fulfilling the order.

In a variant the invention provides a touch sensitive holographic image display device for holographically projecting a touch sensitive displayed image onto a curved display surface, the device comprising: a spatial light modulator (SLM) to display a hologram; an illumination system to illuminate said displayed hologram; projection optics to project light from said illuminated displayed hologram onto said display surface to form said image; and a processor having an input to received image data for display and having an output for driving said SLM, and wherein said processor is configured to process said image data to generated hologram data for display on said SLM to form said image on said display surface;

non-volatile data memory coupled to said processor to store wavefront correction data for said display surface; wherein said processor is configured to apply a wavefront correction responsive to said stored wavefront correction data when generating said hologram data to correct said image for aberration due to a shape of said display surface; a touch sensing system to detect touch of said display surface and having a touch data output to provide detected touch data; and a control system configured to control said device responsive to detection of a touch of said displayed image.

The display surface may, in embodiments, be a curved touch sensitive panel or screen and the image may be projected onto the screen either from in front or in some preferred implementations, from behind. Thus, for example, the display surface may define part of a convex shape and the holographic projection system may be located behind this panel which may comprise, for example, a transparent or translucent plastic or glass surface. This surface may be made touch sensitive by employing acoustic touch detection techniques, for example of the type described in WO2006/108443, or an optical remote touch sensing system may be employed to detect a splash of scattered light resulting from touching the display surface. Again a predetermined mapping may be employed to map from a touch position to rectangular coordinates of a source image displayed.

In embodiments the wavefront correction date comprises phase data, employed to modulate the hologram data, for example defining a phase map of a portion of the display surface on which the image is to be displayed. There are many ways in which such wavefront correction data may be obtained, for example the aberration introduced by the curved display surface may be measured by employing a wavefront sensor and/or this may be modelled with an optical modelling system, for example using Zernike polynomials or Seidel functions.

This summary provides only a general outline of some embodiments of the invention. Many other objects, features, advantages and other embodiments of the invention will become more fully apparent from the following detailed description, the appended claims and the accompanying drawings.

DETAILED DESCRIPTION

This invention relates to touch sensitive holographic image display systems, in particular to systems which are able to project onto a surface at an acute angle. The invention also provides related methods and corresponding processor control code.

Referring to FIG. 1a, this shows a side view of an embodiment of a holographic image projection device 100 having 2 configurations, the first configuration in which the device projects forwards, and a second configuration (shown in FIG. 1c) in which the device projects outwards and downwards onto a surface 106 such as a table-top. The device includes an output lens 102 and a foldable stand, for example a bipod stand 104 to support the device in its table-down configuration. In some preferred embodiments the foldable support 104 or some similar mechanism supports the device at a known angle to the surface 106 in its table-down configuration, which has the advantage that the degree of keystone distortion is also known and can therefore automatically be compensated for. Further, in embodiments because the table-down configuration is a pre-determined configuration a calibration procedure can be used to determine not only the general keystone distortion but also other aberrations which will typically be present albeit at a second order, so that compensation may also be made for these.

FIG. 1b shows the device 100 from above illustrating that, typically, the device may have a relatively wide lateral light output angle, in this example approximately 90°. The vertical light output angle is preferably smaller and in the illustrated example is around 45°. FIG. 1c shows the effect of tilting the arrangement of FIG. 1a downwards towards a surface such as a table-top-the keystone distortion of FIG. 1d results and as can be seen from distances d1 and d2 different regions of the projected image are at very different distances from the output lens (one distance may be 2 or 3 times the other). There will also be a difference in brightness between those regions of the displayed image close to the output lens and those further away.

In some preferred embodiments of the holographic projector 100 configuration of the device into the table-down projection mode is detected automatically, for example by detecting deployment of the stand or support 104, say by means of a microswitch or by using a tilt sensor to detect the tilting of the device into its table-down mode.

FIG. 1e shows an alternative embodiment of a holographic image projector 100' according to embodiment of the invention in which output optics 102' are configurable to select between a forward projection mode and a table-down projection mode. The latter may be selected, for example, by translating the output lens or optics 102' downwards, into an off-axis configuration to project the output image downwards. Again this translation may be detected automatically by a sensor; alternatively a control may be provided to control the optics to select either the forward projection or table-down mode.

Hologram Generation

Preferred embodiments of the invention use an OSPR-type hologram generation procedure, and we therefore describe examples of such procedures below. However embodiments of the invention are not restricted to such a hologram generation procedure and may be employed with other types of hologram generation procedure including, but not limited to: a Gerchberg-Saxton procedure (R. W. Gerchberg and W. O. Saxton, "A practical algorithm for the determination of phase from image and diffraction plane pictures" Optik 35, 237-246 (1972)) or a variant thereof, Direct Binary Search (M. A. Seldowitz, J. P. Allebach and D. W. Sweeney, "Synthesis of digital holograms by direct binary search" Appl. Opt. 26, 2788-2798 (1987)), simulated annealing (see, for example, M. P. Dames, R. J. Dowling, P. McKee, and D. Wood, "Efficient optical elements to generate intensity weighted spot arrays: design and fabrication," Appl. Opt. 30, 2685-2691 (1991)), or a POCS (Projection Onto Constrained Sets) procedure (see, for example, C. -H. Wu, C. -L. Chen, and M. A. Fiddy, "Iterative procedure for improved computer-generated-hologram reconstruction," Appl. Opt. 32, 5135- (1993)).

Optical System

FIG. 2 shows an example optical layout for a touch sensitive holographic image projector 200 according to an embodiment of the invention. In the full color holographic image projector of FIG. 2 there are red R, green G, and blue B lasers. The system also includes the following additional elements:

SLM is the hologram SLM (spatial light modulator).
L1, L2 and L3 are collimation lenses for the R, G and B lasers respectively (optional, depending upon the laser output).
M1, M2 and M3 are corresponding dichroic minors.
PBS (Polarising Beam Splitter) transmits the incident illumination to the SLM. Diffracted light produced by the SLM—naturally rotated (with a liquid crystal SLM) in polarisation by 90 degrees—is then reflected by the PBS towards L4.

Mirror M4 folds the optical path.

Lenses L4 and L5 form an output telescope (demagnifying optics), as with holographic projectors we have previously described. The output projection angle is proportional to the ratio of the focal length of L4 to that of L5. In embodiments L4 may be encoded into the hologram(s) on the SLM, for example using the techniques we have described in WO2007/110668, and/or output lens L5 may be replaced by a group of projection lenses. In embodiments L5 may comprise a wide-angle or fisheye lens, mounted for translation perpendicular to the output optical axis (left-right in FIG. 2), to enable configuration of the output optical system as an off-axis system for table-down projection.

D1 is a piezoelectrically-actuated diffuser located at intermediate image plane to reduce speckle, as we have described, for example in GB0800167.9. Moving the diffuser rapidly, preferably in two orthogonal directions to remove streaking, generates random phases on a length scale that is smaller and/or a time scale that is faster than the projected image pixel.

The device also includes a touch sensing system 250, in embodiments an optical system. In one implementation this comprises an infrared laser 252 coupled to light sheet generating optics 254, for example in a simple embodiment a cylindrical lens or in more sophisticated arrangements off the shelf-optics for generating a light sheet. This provides a light sheet just above the holographically projected display 256 and on touching the display scattered light is detected by imaging optics 258 and CMOS sensor to 260, which provides an output to touch detect signal processing circuitry as described further later. In embodiments the imaging optics and sensor maybe located behind Minor 4 where this is arrange to be ir-transmitting, in this way sharing the projection optics. The skilled person will, however, appreciate that there are other ways in which the holographic image projection optics and touch sensing imaging optics maybe shared and FIG. 2 merely illustrates one example.

A system controller 202 performs signal processing in either dedicated hardware, or in software, or in a combination of the two, as described further below. Thus controller 202 inputs image data and touch sensed data and provides hologram data 204 to the SLM. The controller also provides laser light intensity control data to each of the three lasers to control the overall laser power in the image.

In embodiments the SLM may be a liquid crystal device. Alternatively, other SLM technologies to effect phase modulation may be employed, such as a pixellated MEMS-based piston actuator device.

OSPR

Broadly speaking in our preferred method the SLM is modulated with holographic data approximating a hologram of the image to be displayed. However this holographic data is chosen in a special way, the displayed image being made up of a plurality of temporal sub-frames, each generated by modulating the SLM with a respective sub-frame hologram, each of which spatially overlaps in the replay field (in embodiments each has the spatial extent of the displayed image).

Each sub-frame when viewed individually would appear relatively noisy because noise is added, for example by phase quantisation by the holographic transform of the image data. However when viewed in rapid succession the replay field images average together in the eye of a viewer to give the impression of a low noise image. The noise in successive temporal subframes may either be pseudo-random (substantially independent) or the noise in a subframe may be dependent on the noise in one or more earlier subframes, with the aim of at least partially cancelling this out, or a combination may be employed. Such a system can provide a visually high quality display even though each sub-frame, were it to be viewed separately, would appear relatively noisy.

The procedure is a method of generating, for each still or video frame $I=I_{xy}$, sets of N binary-phase holograms $h^{(1)} \ldots h^{(N)}$. In embodiments such sets of holograms may form replay fields that exhibit mutually independent additive noise. An example is shown below:

1. Let $G_{xy}^{(n)}=I_{xy}\exp(j\phi_{xy}^{(n)})$ where $\phi_{xy}^{(n)}$ is uniformly distributed between 0 and $2\pi$ for $1 \leq n \leq N/2$ and $1 \leq x, y \leq m$
2. Let $g_{uv}^{(n)}=F^{-1}[G_{xy}^{(n)}]$ where $F^{-1}$ represents the two-dimensional inverse Fourier transform operator, for $1 \leq n \leq N/2$
3. $m_{uv}^{(n)}=\Re\{g_{uv}^{(n)}\}$ for $1 \leq n \leq N/2$
4. Let $m_{uv}^{(n+N/2)}=\Im\{g_{uv}^{(n)}\}$ for $1 \leq n \leq N/2$
5. Let $$h_{uv}^{(n)} = \begin{cases} -1 & \text{if } m_{uv}^{(n)} < Q^{(n)} \\ +1 & \text{if } m_{uv}^{(n)} \geq Q^{(n)} \end{cases}$$

where $Q^{(n)}=\text{median}(m_{uv}^{(n)})$ and $1 \leq n \leq N$.

Step 1 forms N targets $G_{xy}^{(n)}$ equal to the amplitude of the supplied intensity target $I_{xy}$, but with independent identically-distributed (i.i.t.), uniformly-random phase. Step 2 computes the N corresponding full complex Fourier transform holograms $g_{uv}^{(n)}$. Steps 3 and 4 compute the real part and imaginary part of the holograms, respectively. Binarisation of each of the real and imaginary parts of the holograms is then performed in step 5: thresholding around the median of $m_{uv}^{(n)}$ ensures equal numbers of −1 and 1 points are present in the holograms, achieving DC balance (by definition) and also minimal reconstruction error. The median value of $m_{uv}^{(n)}$ may be assumed to be zero with minimal effect on perceived image quality.

Figure 3A:
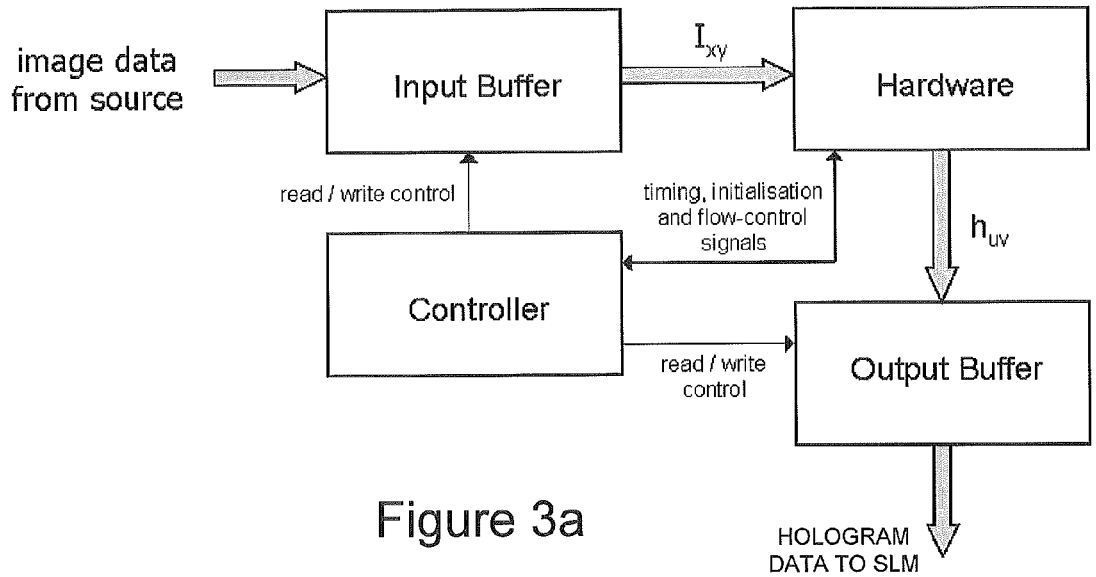
FIGS. 3a to 3d show, respectively, a block diagram of a hologram data calculation system, operations performed within the hardware block of the hologram data calculation system, energy spectra of a sample image before and after multiplication by a random phase matrix, and an example of a hologram data calculation system with parallel quantisers for the simultaneous generation of two sub-frames from real and imaginary components of complex holographic sub-frame data.

FIG. 3a, from our WO2006/134398, shows a block diagram of a hologram data calculation system configured to implement this procedure. The input to the system is preferably image data from a source such as a computer, although other sources are equally applicable. The input data is temporarily stored in one or more input buffer, with control signals for this process being supplied from one or more controller units within the system. The input (and output) buffers preferably comprise dual-port memory such that data may be written into the buffer and read out from the buffer simultaneously. The control signals comprise timing, initialisation and flow-control information and preferably ensure that one or more holographic sub-frames are produced and sent to the SLM per video frame period.

The output from the input comprises an image frame, labelled I, and this becomes the input to a hardware block (although in other embodiments some or all of the processing may be performed in software). The hardware block performs a series of operations on each of the aforementioned image frames, I, and for each one produces one or more holographic sub-frames, h, which are sent to one or more output buffer. The sub-frames are supplied from the output buffer to a display device, such as a SLM, optionally via a driver chip.

Figure 3B:
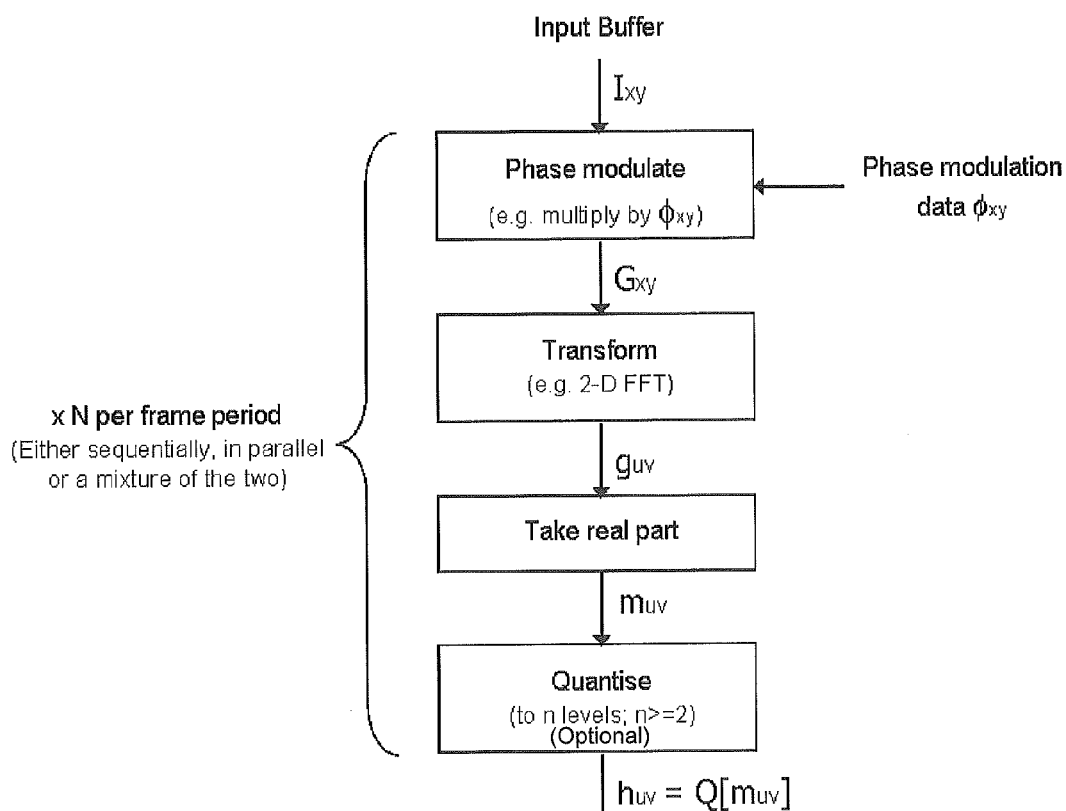

FIG. 3b shows details of the hardware block of FIG. 3a; this comprises a set of elements designed to generate one or more holographic sub-frames for each image frame that is supplied to the block. Preferably one image frame, $I_{xy}$, is supplied one or more times per video frame period as an input. Each image frame, $I_{xy}$, is then used to produce one or more holographic sub-frames by means of a set of operations comprising one or more of: a phase modulation stage, a space-frequency transformation stage and a quantisation stage. In embodiments, a set of N sub-frames, where N is greater than or equal to one, is generated per frame period by means of using either one sequential set of the aforementioned operations, or a several sets of such operations acting in parallel on different sub-frames, or a mixture of these two approaches.

Figure 3C:
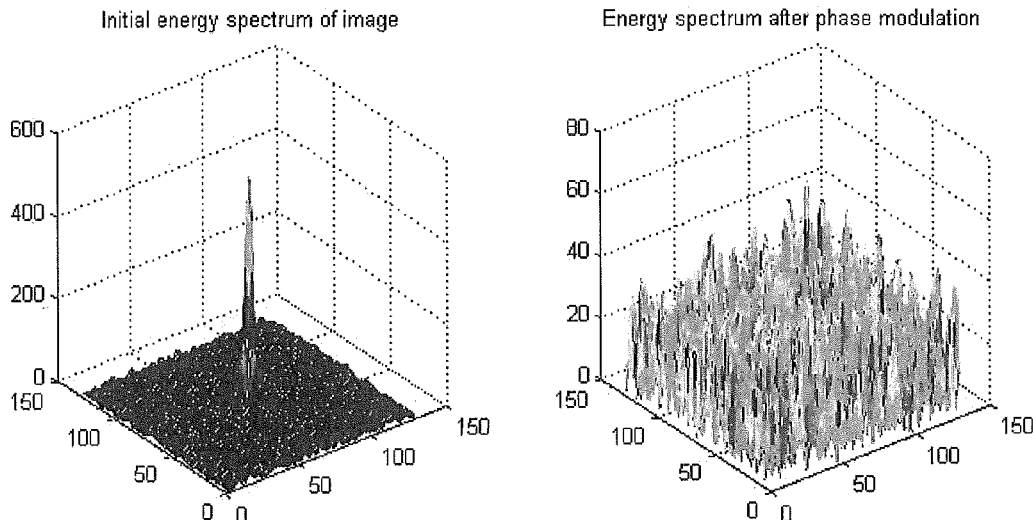

The purpose of the phase-modulation block is to redistribute the energy of the input frame in the spatial-frequency domain, such that improvements in final image quality are obtained after performing later operations. FIG. 3c shows an example of how the energy of a sample image is distributed before and after a phase-modulation stage in which a pseudo-random phase distribution is used. It can be seen that modulating an image by such a phase distribution has the effect of redistributing the energy more evenly throughout the spatial-frequency domain. The skilled person will appreciate that there are many ways in which pseudo-random binary-phase modulation data may be generated (for example, a shift register with feedback).

The quantisation block takes complex hologram data, which is produced as the output of the preceding space-frequency transform block, and maps it to a restricted set of values, which correspond to actual modulation levels that can be achieved on a target SLM (the different quantised phase retardation levels may need not have a regular distribution). The number of quantisation levels may be set at two, for example for an SLM producing phase retardations of 0 or π at each pixel.

Figure 3D:
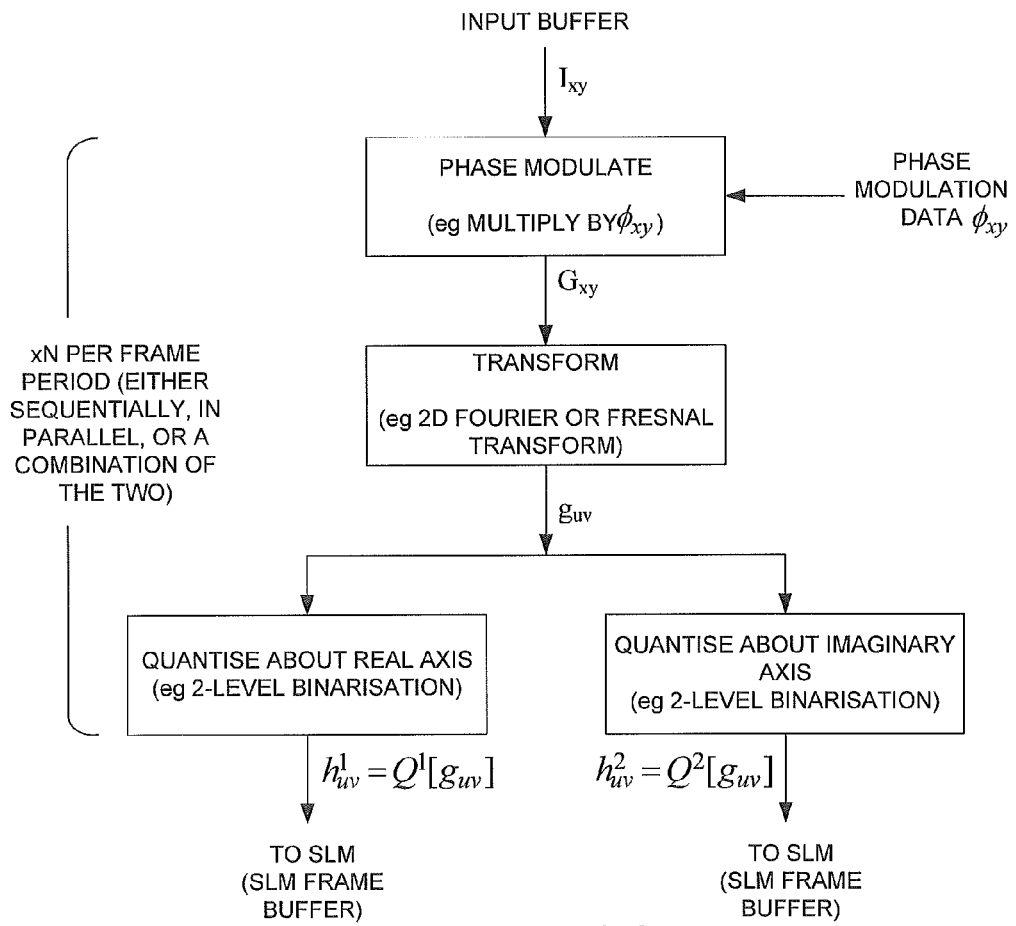

In embodiments the quantiser is configured to separately quantise real and imaginary components of the holographic sub-frame data to generate a pair of holographic sub-frames, each with two (or more) phase-retardation levels, for the output buffer. FIG. 3d shows an example of such a system. It can be shown that for discretely pixellated fields, the real and imaginary components of the complex holographic sub-frame data are uncorrelated, which is why it is valid to treat the real and imaginary components independently and produce two uncorrelated holographic sub-frames.

An example of a suitable binary phase SLM is the SXGA (1280×1024) reflective binary phase modulating ferroelectric liquid crystal SLM made by CRL Opto (Forth Dimension Displays Limited, of Scotland, UK). A ferroelectric liquid crystal SLM is advantageous because of its fast switching time. Binary phase devices are convenient but some preferred embodiments of the method use so-called multiphase spatial light modulators as distinct from binary phase spatial light modulators (that is SLMs which have more than two different selectable phase delay values for a pixel as opposed to binary devices in which a pixel has only one of two phase delay values). Multiphase SLMs (devices with three or more quantized phases) include continuous phase SLMs, although when driven by digital circuitry these devices are necessarily quantised to a number of discrete phase delay values. Binary quantization results in a conjugate image whereas the use of more than binary phase suppresses the conjugate image (see WO 2005/059660).

Adaptive OSPR

In the OSPR approach we have described above subframe holograms are generated independently and thus exhibit independent noise. In control terms, this is an open-loop system.

However one might expect that better results could be obtained if, instead, the generation process for each subframe took into account the noise generated by the previous sub-frames in order to cancel it out, effectively "feeding back" the perceived image formed after, say, n OSPR frames to stage n+1 of the algorithm. In control terms, this is a closed-loop system.

One example of this approach comprises an adaptive OSPR algorithm which uses feedback as follows: each stage n of the algorithm calculates the noise resulting from the previously-generated holograms $H_1$ to $H_{n-1}$, and factors this noise into the generation of the hologram $H_n$ to cancel it out. As a result, it can be shown that noise variance falls as $1/N^2$. An example procedure takes as input a target image T, and a parameter N specifying the desired number of hologram sub-frames to produce, and outputs a set of N holograms $H_1$ to $H_N$ which, when displayed sequentially at an appropriate rate, form as a far-field image a visual representation of T which is perceived as high quality:

An optional pre-processing step performs gamma correction to match a CRT display by calculating $T(x, y)^{1.3}$. Then at each stage n (of N stages) an array F (zero at the procedure start) keeps track of a "running total" (desired image, plus noise) of the image energy formed by the previous holograms $H_1$ to $H_{n-1}$ so that the noise may be evaluated and taken into account in the subsequent stage: $F(x, y):=F(x, y)+|F[H_{n-1}(x, y)]|^2$. A random phase factor $\phi$ is added at each stage to each pixel of the target image, and the target image is adjusted to take the noise from the previous stages into account, calculating a scaling factor $\alpha$ to match the intensity of the noisy "running total" energy F with the target image energy $(T')^2$. The total noise energy from the previous n−1 stages is given by $\alpha F-(n-1)(T')^2$, according to the relation $$a := \frac{\sum_{x,y} T'(x, y)^4}{\sum_{x,y} F(x, y) \cdot T'(x, y)^2}$$

and therefore the target energy at this stage is given by the difference between the desired target energy at this iteration and the previous noise present in order to cancel that noise out, i.e. $(T')^2-[\alpha F-(n-1)(T')^2]=n(T')^2+\alpha F$. This gives a target amplitude $|T''|$ equal to the square root of this energy value, i.e.

$$T''(x, y) := \begin{cases} \sqrt{2T'(x, y)^2 - \alpha F} \cdot \exp\{j\phi(x, y)\} & \text{if } 2T'(x, y)^2 > \alpha F \\ 0 & \text{otherwise} \end{cases}$$

At each stage n, H represents an intermediate fully-complex hologram formed from the target T'' and is calculated using an inverse Fourier transform operation. It is quantized to binary phase to form the output hologram $H_n$, i.e.

$$H(x, y) := F^{-1}[T''(x, y)]$$

$$H_n(x, y) = \begin{cases} 1 & \text{if } \text{Re}[H(x, y)] > 0 \\ -1 & \text{otherwise} \end{cases}$$

Figure 4A:
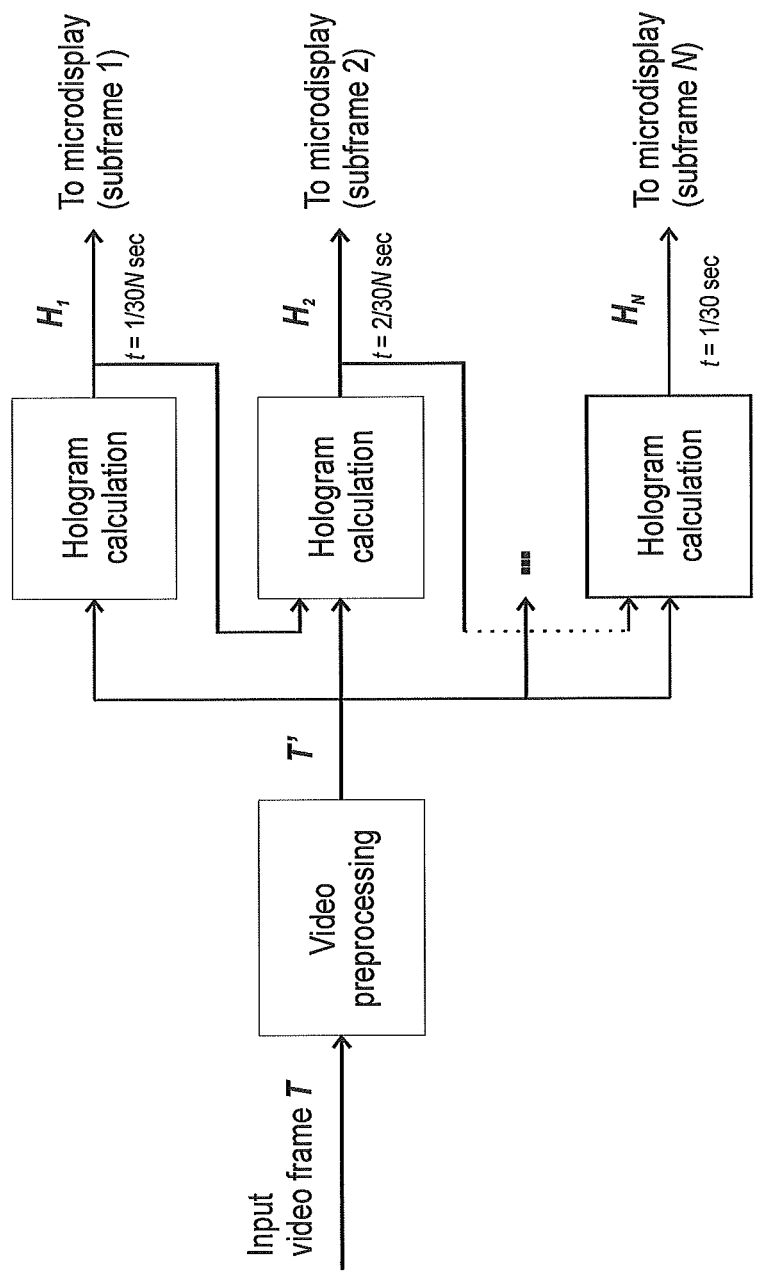
FIGS. 4a and 4b show, respectively, an outline block diagram of an adaptive OSPR-type system, and details of an example implementation of the system.
Figure 4B:
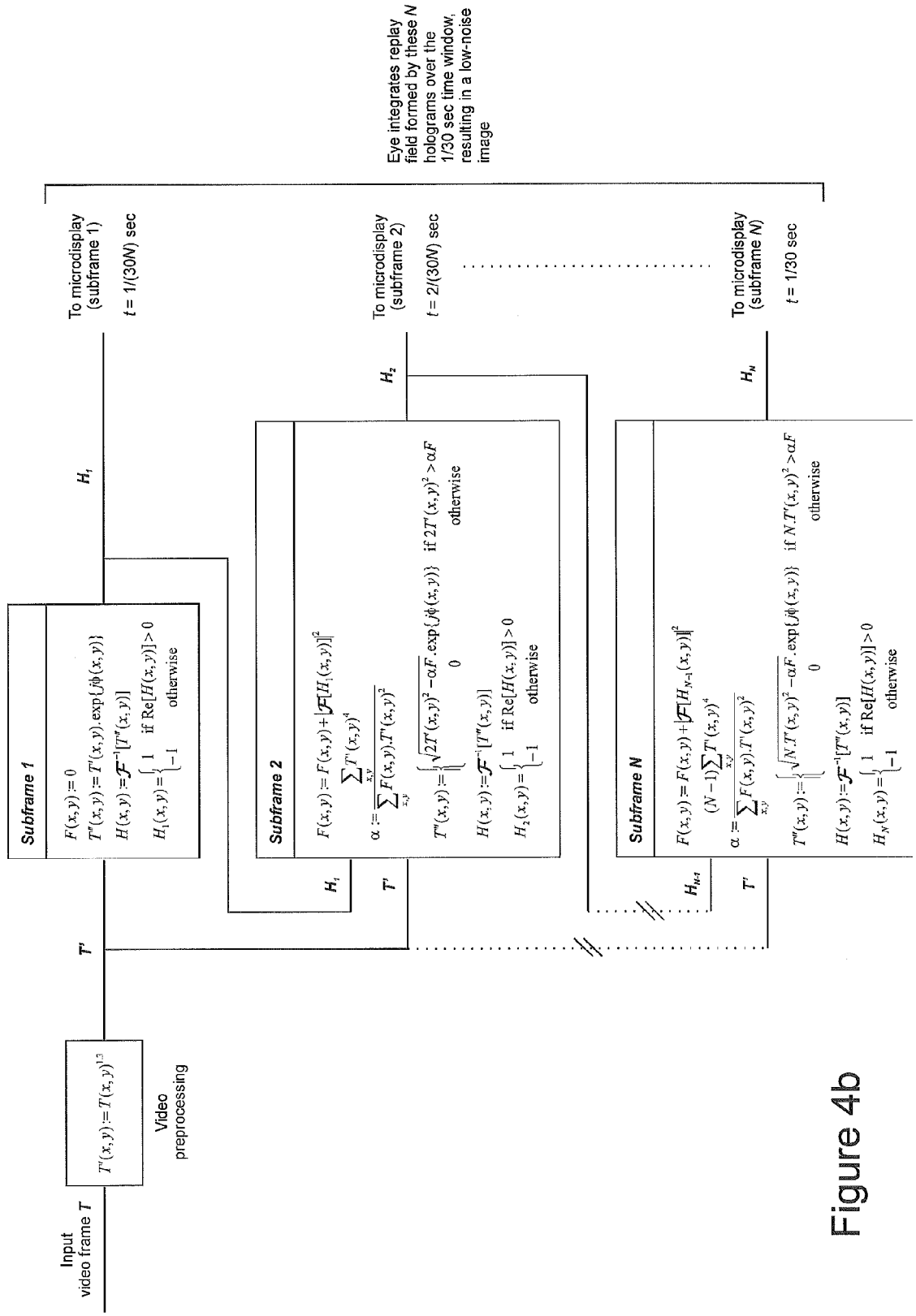

FIG. 4a outlines this method and FIG. 4b shows details of an example implementation, as described above.

Thus, broadly speaking, an ADOSPR-type method of generating data for displaying an image (defined by displayed image data, using a plurality of holographically generated temporal subframes displayed sequentially in time such that they are perceived as a single noise-reduced image), comprises generating from the displayed image data holographic data for each subframe such that replay of these gives the appearance of the image, and, when generating holographic data for a subframe, compensating for noise in the displayed image arising from one or more previous subframes of the sequence of holographically generated subframes. In embodiments the compensating comprises determining a noise compensation frame for a subframe; and determining an adjusted version of the displayed image data using the noise compensation frame, prior to generation of holographic data for a subframe. In embodiments the adjusting comprises transforming the previous subframe data from a frequency domain to a spatial domain, and subtracting the transformed data from data derived from the displayed image data.

More details, including a hardware implementation, can be found in WO2007/141567 hereby incorporated by reference.

Colour Holographic Image Projection

The total field size of an image scales with the wavelength of light employed to illuminate the SLM, red light being diffracted more by the pixels of the SLM than blue light and thus giving rise to a larger total field size. Naively a color holographic projection system could be constructed by superimposed simply three optical channels, red, blue and green but this is difficult because the different color images must be aligned. A better approach is to create a combined beam comprising red, green and blue light, as shown in FIG. 2 above, and to provide this to a common SLM, scaling the sizes of the images to match one another.

An example system comprises red, green, and blue collimated laser diode light sources, for example at wavelengths of 638 nm, 532 nm and 445 nm, driven in a time-multiplexed manner. Each light source comprises a laser diode and, if necessary, a collimating lens and/or beam expander. The total field size of the displayed image depends upon the pixel size of the SLM but not on the number of pixels in the hologram displayed on the SLM. A target image for display can be padded with zeros in order to generate three color planes of different spatial extents for blue, green and red image planes. In the holograms for each color plane the information in the hologram is distributed over the complete set of pixels.

Touch-Sensitive Holographic Image Projection

Figure 5A:
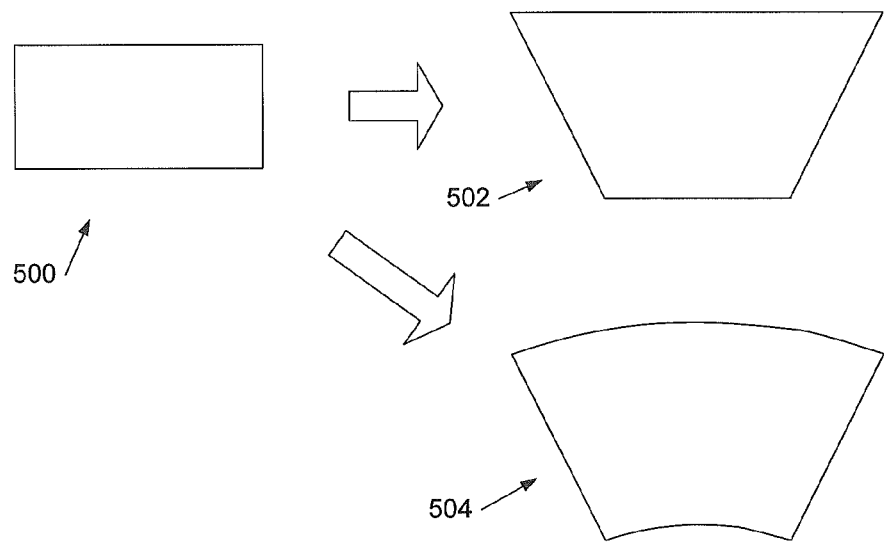
FIGS. 5a to 5c show, respectively, examples of different types of keystone distortion, an example calibration pattern for correction of keystone distortion, and an example target image field for processing by a hologram generation procedure for holographic image projection.

Referring now to FIG. 5a this shows examples of two different types of keystone distortion of a rectangular input image 500, the trapezoidal pattern 502 resulting from the tilting shown in FIG 1c, the arcuate trapezoidal pattern 504 resulting from translation of a fisheye output lens as shown in FIG 1e. The degree of distortion depends upon the height of the output lens above the projection surface, and also on the angle of tilt.

The distortion patterns shown in FIG. 5a maybe described analytically, as is well known to those skilled in the art. For details reference may be made to, for example, Wikipedia (RTM). Example equations describing the trapezoidal distortion of FIG. 5a are given in the prior art, for example in U.S. Pat. No. 6,367,933 (WO00/21282) at column 20 line 41 to column 21 line 6 and FIGS. 9A and 9B, to which reference may again be made for details. An alternative expression of the distortion, using warp polynomials, may be found in WO02/101443 at page 8 line 29 et seq., again to which reference may be made for details.

Figure 5B:
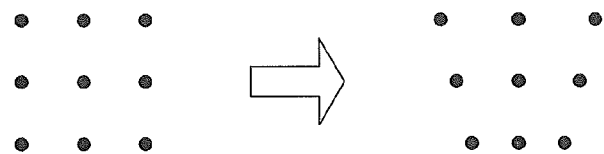

In an alternative approach a calibration pattern may be projected, as illustrated in FIG. 5b, which shows on the left hand side a grid of points and on the right hand side the projected, keystone-distorted image. A point in the distorted image may be associated with a point in the input image to define a mapping from one to the other. Such an approach is described in detail in the previously mentioned references. The distortion map may be defined for a single angle if, say, the angle at which the table-down projection is used is known or defined for example by the configuration of the projector; alternatively a range of distortion maps may be defined and stored for a range of different projection angles. The distortion map may be determined as a calibration for a single, reference device and then applied to other devices or alternatively the distortion may be mapped individually for a given holographic projector, for example during manufacture, and this map stored in non-volatile memory within the device. In either case the distortion map may take account of distortions other than keystone distortion, for example arising from the use of optical components with imperfections in the optical arrangement of FIG. 2. It will also be appreciated that separate distortion maps may be stored for red, green, and/or blue color components of the projected image.

Figure 5C:
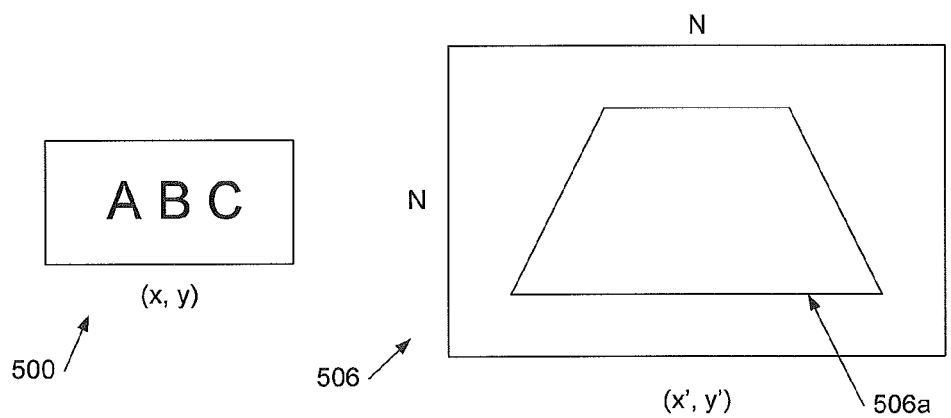

Referring now to FIG. 5c, this shows an input image 500 for display and a corresponding target image space 506 including a target image 506a for hologram generation, distorted so that when a hologram is generated from this the projected image compensates for the keystone distortion shown in FIG. 5a.

In embodiments the mapping between the target image 506a and the input image 500 is described by a pair of polynomial expansions and, more particularly by two sets of polynomial coefficients for these expansions. If we refer to the target image space using coordinates (x', y'), and the input image using coordinates (x, y) then we can define a location (x, y) in the input image space as a pair of functions f', g' of the coordinates in the (anti-distorted) target image space, as follows:

$$f'(x', y') \to x$$

$$g'(x', y') \to y$$

Likewise:

$$f(x, y) \to x'$$

$$g(x, y) \to y'$$

For reasons explained further below, it is preferable that the mapping from the target to the input image rather than vice-versa is employed.

An example pair of polynomial expansions is given below:

$$f'(x', y') = \sum_i \sum_j a_{ij} x^i y^j$$

$$g'(x', y') = \sum_i \sum_j b_{ij} x^i y^j$$

The first few terms of the polynomial expansion of f' are as follows:

$$f'(x',y') = a_{00} + a_{10}x + a_{01}y + a_{11}xy + a_{20}x^2 + \ldots$$

where broadly speaking coefficient $a_{00}$ defines position, $a_{10}$ and $a_{01}$ define scale, $a_{11}$ defines skew, and $a_{20}$ and so forth are higher order coefficients. The value of $a_{ij}$ is dependent on the angle of projection θ, on i and on j; the value of bij is similarly dependent on θ, i and j. It can be helpful to consider (x, y) space as being "camera"—that is defining what it is desired to project.

Figure 6A:
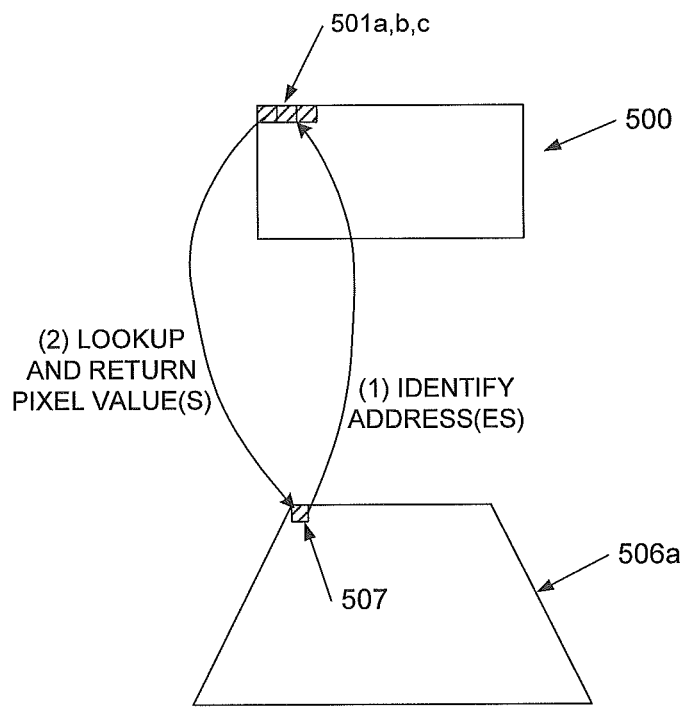
FIGS. 6a and 6b show, respectively, a pixel value lookup technique for use with embodiments of the invention, and an example of a multicolor target image field illustrating compensation for the different diffractive effects of different colors arising from holographic image projection.

Referring now to FIG. 6a, this again shows the input image 500 and the target image 506a for hologram generation, the latter being "anti-distorted". More particularly FIG. 6a shows a single pixel 507 of target image 506a, illustrating how this pixel maps to a plurality of pixels 501a, b, c in the input image 500. This can be appreciated because the distortion effectively shortens the nearer edge of the input image as compared with the more distant edge from the output optics. Therefore in some preferred embodiments the target image is constructed by stepping through the (x', y') positions in the target image 506a and for each looking up the addresses of the corresponding pixels in the input image and using the values from these pixels, in the example pixels 501, a, b, c, to assign a value to the corresponding pixel 507 in the target image where, as in the example, multiple input image pixels correspond to a single target image pixel the values of the input image pixels may, for example, be summed or some other approach may be employed for example selecting a value such as a mean, medium or mode value. Thus preferred embodiments apply and inverse mapping, from the target to the input image space. By contrast mapping from the input image to the target image can leave holes in the target image, that is pixels with unpopulated values. In this case a single pixel of the input image may be mapped to a regular or irregular spot with an extended size (over multiple pixels) in the target image, optionally with a super imposed intensity distribution such as a gaussian distribution.

Once the target image T(x', y') has been created a hologram H(X, Y) of the target image is generated to approximate the following expression:

$$H(X, Y) = \sum_{i=0}^{N-1}\sum_{j=1}^{N-1} T(x', y') \exp\left(\frac{-2\pi j(ix + jy)}{N}\right)$$

where N represents the number of pixels in the hologram in the X and Y-directions (here for simplicity, the same number). Referring to the target image 506a shown in FIG. 5c, the region of the target image space 506 outside image 506a is filled with zeros and therefore in some preferred implementations the evaluation of H(X, Y) is performed over a window of target image space 506 defined by the target image 506a, for efficiency.

Figure 6B:
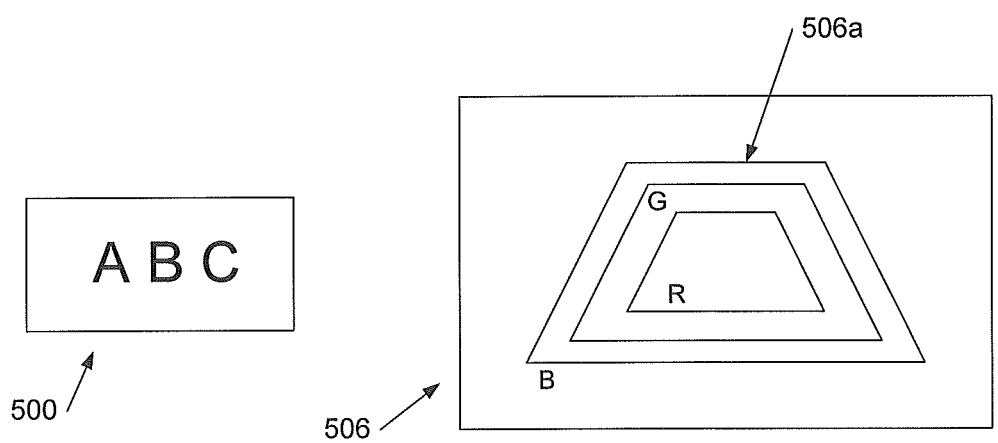

Referring now to FIG. 6b, we have described above an example of a color holographic image projection system. In the context of table-down holographic image projection to provide a multicolor/full color display preferred embodiments of the system employ three differently scaled and/or distorted target images 506a, as illustrated in FIG. 6b, one of each of the three laser colors red, green and blue-denoted R, G and B in the figure. Thus in embodiments separate functions f', g' are provided for each color, although in other embodiments a single target image/distortion map is employed and scaled according to the wavelength of the laser light used for the respective color plane, more particularly scaled by 1/λ. It will be understood that each pixel of a hologram calculated from the target image 506a contributes to substantially the whole displayed image, the displayed image is scaled in inverse proportion to wavelength—that is the blue image would be smaller because the blue light is diffracted less, and therefore the blue target image enlarged so that the projected images for the three color planes substantially match inside.

Referring again to the polynomial expansions described above, for an inverse mapping, that is from target to input image space, where scaling is applied the (0,0) coefficients are not scaled, the (1,0) and (0,1) coefficients are scaled by reciprocal wavelength, and optionally the coefficients of higher power are scaled accordingly, for example the (1,1), (2,0), and (0,2) coefficients being scaled by 1/λ² and so forth. Thus for example, for 440 nm blue light and 640 nm red light:

$$a_{10}^R = \frac{640}{440} a_{10}^B.$$

In other embodiments, however, a set of functions $f^{R_1}$, $g^{R_1}$, $f^{G_1}$, $g^{G_1}$, $f^{B_1}$, $g^{B_1}$ is employed to correct for chromatic aberration, positioning of the different colored lasers and the light. When mapping using a forward function from the input image to the target image space the scaling applied is to multiply rather than divide by wavelength and the above approaches are adapted mutatis mutandis.

It is further desirable to correct for changes in brightness per unit area which result from the distortion of the type shown in FIG. 5a. One approach would be to calibrate for this change and provide an anti-distortion calibration map to apply similarly to that for spatial distortion. Another approach, however, is to determine an intensity scale factor as a function of position, for example by determining what change of area in the original, input image results from a change of corresponding area in the anti-distorted space of target image 506a by the same amount. This can be determined by determining the derivative of the target image 506a with respect to the input image 500 in each of two orthogonal directions in the image plane, more particularly by calculating an intensity scale factor A(x', y') according to the following equation:

$$A(x', y') = \frac{\partial f'(x', y')}{\partial x} \frac{\partial g'(x', y')}{\partial y}$$

The skilled person will appreciate that in going from an input image pixel value to a target image pixel value, if the pixel value defines an intensity then this should be multiplied by (1/A) whereas if the pixel value defines amplitude then in going from the input image to the target image 506a the amplitude is multiplied by (1/√A).

A different approach may, however, be employed when forward mapping from the input image to the target image space. In this case where an input image pixel is mapped to an extended area or spot in the target image space area correction may be performed automatically by adding the contributions from overlapping spots in the target image space—that is a target image pixel value maybe determined by adding pixel values from input image pixels whose extended spots overlap that target image pixel.

In preferred embodiments of the technique an OSPR-type or ADOSPR approach is employed to calculate the holograms for display on the spatial light modulator, as this provides substantial efficiency advantages.

Figure 7A:
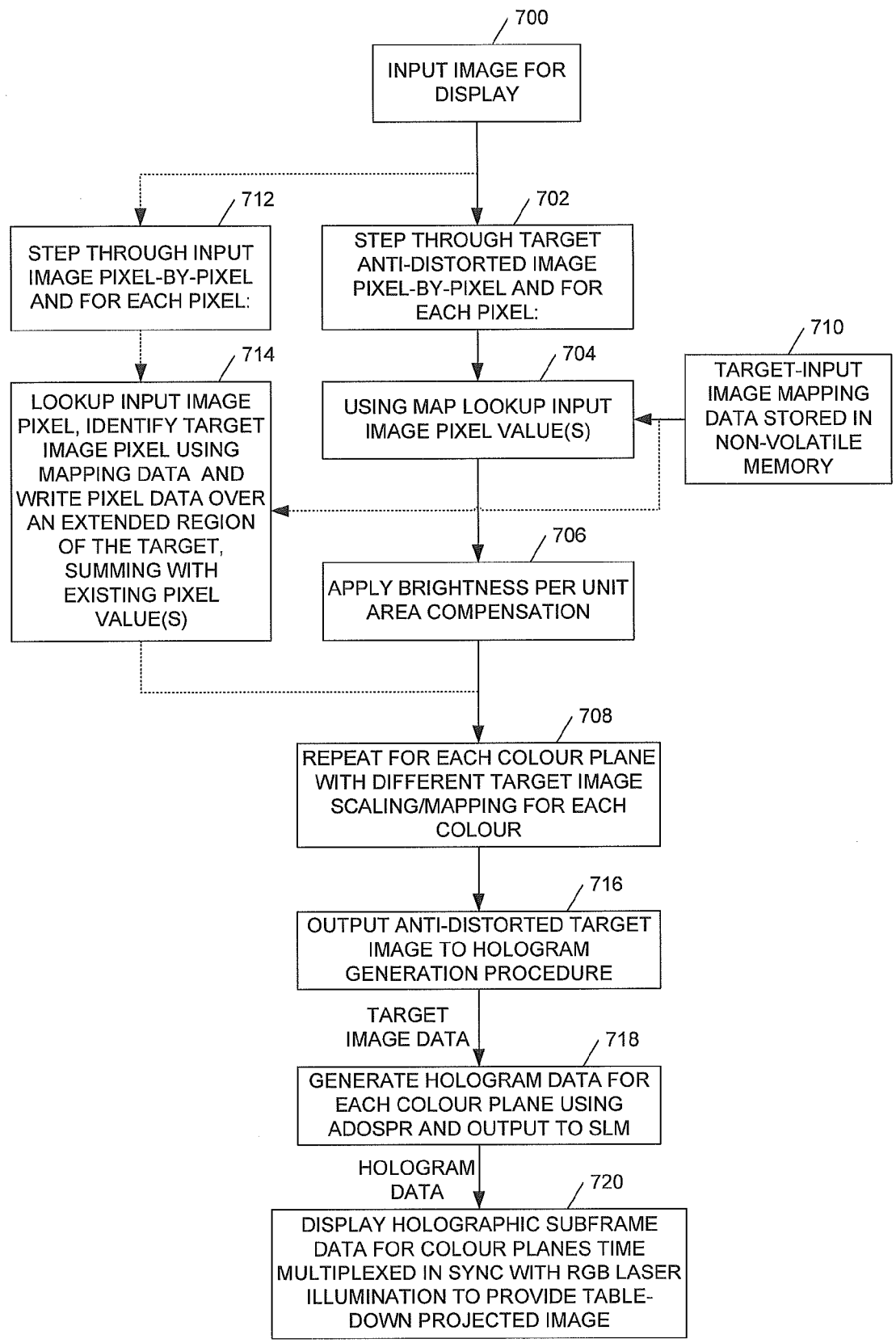
FIGS. 7a and 7b show, respectively, a procedure for generating holographic images for a touch sensitive holographic image display device according to an embodiment of the invention, and a touch-detect procedure for the device.

Referring now FIG. 7a this shows a flow diagram of an embodiment of a procedure to implement table-down holographic image projection according to embodiments of the invention (the procedure covers the inverse mapping and forward mapping alternatives described above).

Data for an input image for display is received at step 700. Then in an inverse mapping procedure, the procedure steps through the target "anti-distorted" image pixel by pixel (702) and for each target image pixel uses the inverse map to lookup one or more corresponding input image pixel values (704), where the inverse map is to multiple input image pixels averaging (or otherwise combining) these. The procedure then applies brightness per unit area compensation (706) as described above and is repeated for each color plane (708). In preferred embodiments the procedure the inverse map is stored in the form of polynomial coefficients as described above, in non-volatile memory (710). Alternatively some other numeric representation of a map may be employed, or an analytical formula may be used.

Figure 7B:
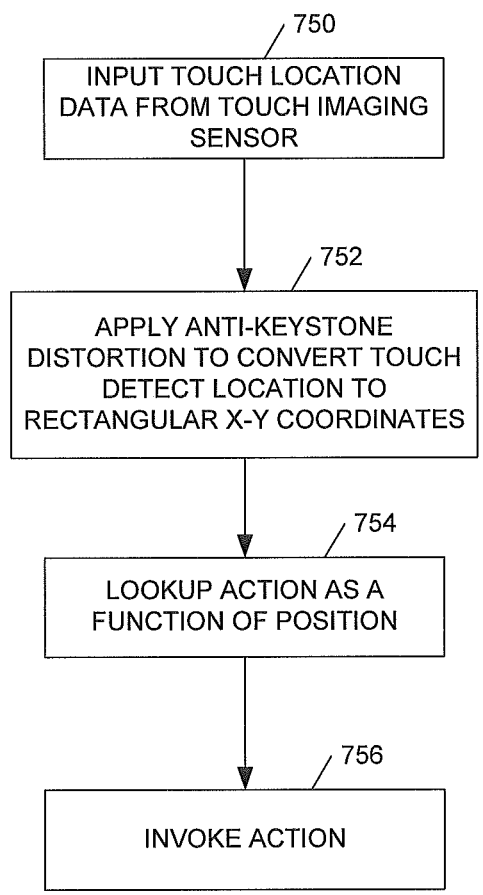

Referring now to FIG. 7b this shows a procedure for handling touch data in embodiments of the invention. More particularly the procedure of FIG. 7b may be employed in a device of the type shown in FIG. 9a (described below) in which a sheet of infrared laser light is provided just above the holographic table-down display and in which a scattered light from touching the display through this sheet is detected, at an acute angle, by an imaging sensor.

Thus in step 750 the procedure inputs touch location data from such a touch imaging sensor and, at step 752, applies anti-keystone distortion to convert the location of detected scattered light in the keystone-distorted image to rectangular X-Y coordinates. This step may be implemented by a procedure complementary to that previously described for projection of the holographic image; alternatively a calibration technique may be employed in which a user is requested to, for example, touch one or more fiducial reference points on a displayed image in order to calibrate the touch sensor and, more particularly, the anti-keystone distortion mapping.

Once the location of a detected touch has been detected any of a range of actions may be performed. In the example procedure at step 754 an action is identified by looking up the detected touch position in a table, for example a table of links between images, and then, at step 756, the identified action is invoked, for example to change displayed images, place an order, and the like. It will be appreciated that "buttons" may be displayed or regions of the display area may be employed, for example a "left" region to go back and a "right" region to go forward amongst a set of images, and that often large areas of the displayed image may invoke no action.

In an alternative approach the procedure steps through the input image pixel by pixel (712) and for each input image pixel maps this to an extended region of the target image using the mapping store in non volatile memory, summing with existing pixel values (714), and again performing this procedure for each color plan (708).

The "anti-distorted" target image data is then provided to a hologram generation procedure (716), in preferred embodiments and ADOSPR-type procedure as described above. This generates holographic data comprising multiple temporal holographic subframes for each color plane of the target image and outputs this for display on the SLM (718). The SLM displays the multiple holographic subframes for each color frame, time multiplexed in synchrony with the red, green and blue laser illumination, to provide the table-down holographically projected image (720).

Figure 8A:
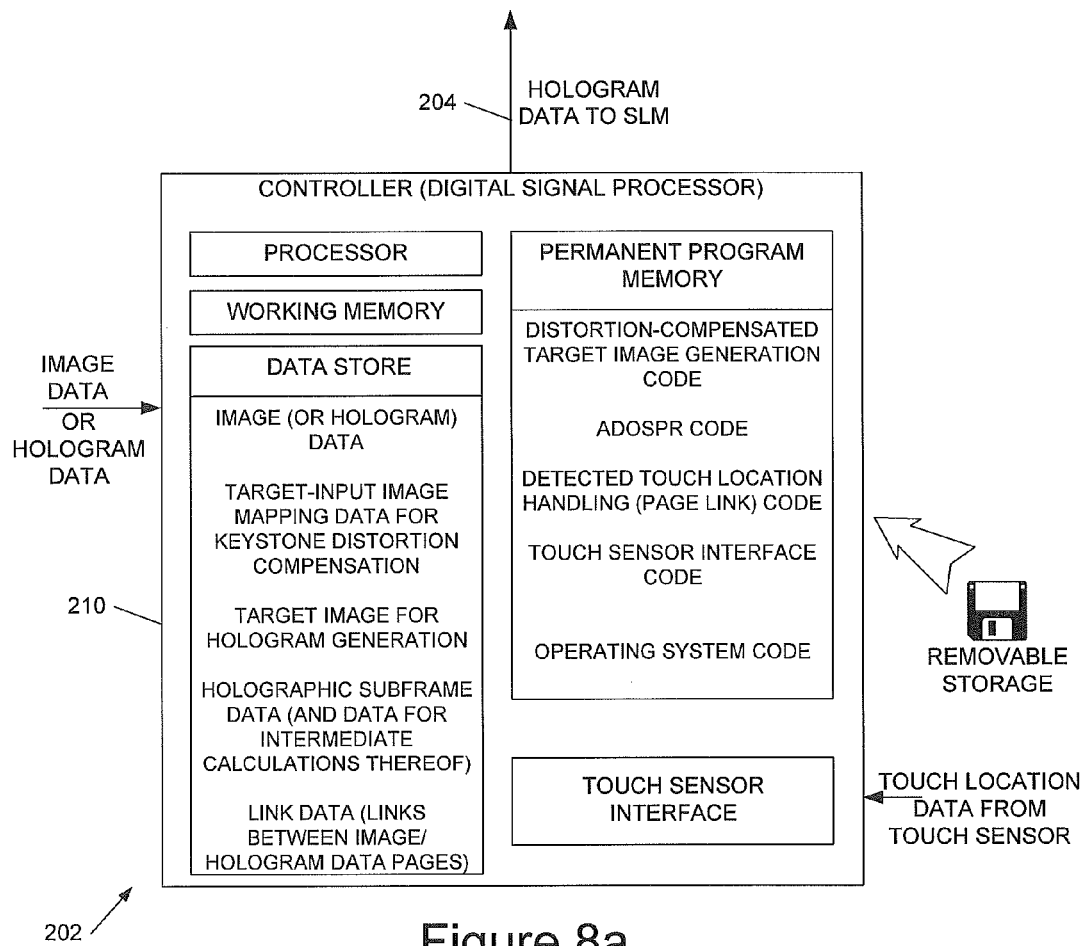
FIGS. 8a and 8b show, respectively software and hardware implementations of examples device controller for an embodiment of the invention; and a hardware implementation of an embodiment of table-down holographic projection system controller according to an embodiment of the invention.

FIG. 8a shows a first example implementation of a touch-sensitive holographic display device controller 202 (of the type shown in FIG. 2), including a digital signal processor 210 operating under control of processor control code (which may be provided on a storage medium such as Flash memory) to implement a procedure as described above. As illustrated the system stores a plurality of display pages, either as image data or as hologram data, as well as associated link or menu data defining position(s) in a displayed image and page(s) they link to. However in other embodiments a simple forward/back touch selection, for example for photos, may be provided.

Figure 8B:
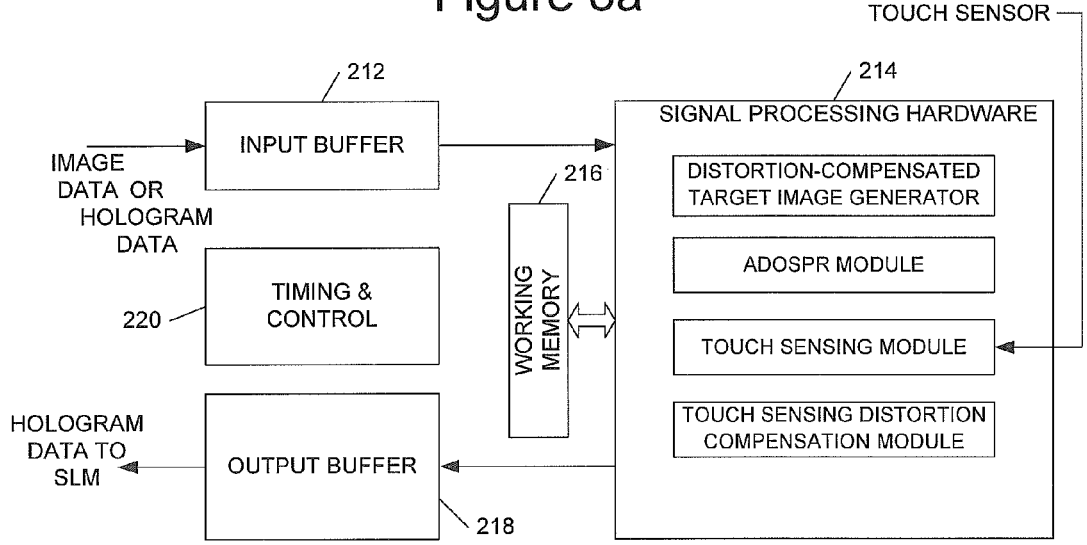

FIG. 8b shows an alternative implementation of system controller 202 employing dedicated signal processing hardware 214 such as an FPGA (field programmable gate array) or ASIC (application specific integrated circuit). In FIG. 8b signal processing hardware 214 is coupled to working memory 216 and operates under control of a timing and control section 220 to receive input image data via an input buffer 212 and to provide hologram data to the SLM via an output buffer 218. The signal processing hardware includes a distortion-compensated target image generator, an ADOSPR module and in the illustrated example, a touch sensing module receiving a signal from a touch sensor, for example, a CMOS imaging device, and a touch sensing distortion compensation module. The digital signal processor of FIG. 8a includes corresponding processor control code and an interface to receive detected touch location data. As previously described depending upon the implementation a range of different sensing devices may be employed optionally incorporated into or alongside the projection optics.

We have described touch-sensitive holographic image projection systems which project an image forward and down as shown, for example, in FIG 1c. However corresponding techniques may also be employed to project an image sideways and down, in addition to or instead of forwards and down. This may be achieved by compensating for horizontal keystone distortion additionally or alternatively to the above described compensation, using a corresponding approach. The skilled person will also appreciate that whilst techniques such as those described above are particularly useful for table-down projection they may also be advantageously employed when projecting at an acute angle onto any nearby surface where extreme distortion, depth of field problems and the like would make other techniques impractical. It will also be appreciated that although, in general, the surface projected onto will be substantially planar the distortion compensation techniques we describe are not limited to projection onto planar surfaces and may also be employed, for example, to project onto a curved surface without substantial distortion. In generally the techniques facilitate projection onto a surface at very short range and at an acute angle—which facilitates applications in a wide range of applications where such projection has hitherto been very difficult or impractical.

Figure 9A:
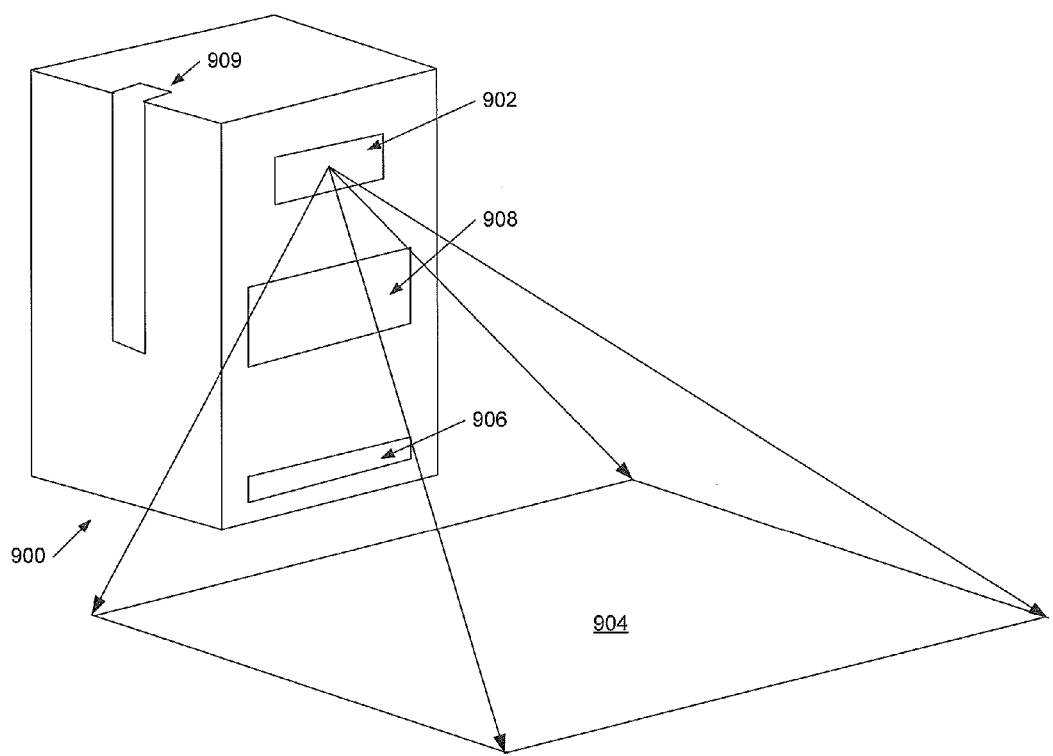

Referring now to FIG. 9a, this shows an embodiment 900 of a touch sensitive table-down holographic image display device according to an embodiment of the invention. The device comprises a holographic image projector 902 configured to operate in a "table-down" mode as previously described, with a wide throw angle, long depth of field, and extreme distortion correction (with no loss of brightness). This projects onto a display area 904 as illustrated. An infrared laser illumination system 906 forms a sheet of infrared light just above display surface 904 and a CMOS imaging sensor system 908 provided with an it-pass lens captures scattered light from touching display surface 904 through the sheet of infrared light. The illustrated embodiment also includes a card reader system 909 to enable the device to accept card payments.

One application for the device of FIG. 9a is to provide an interactive menu in restaurants; because the content of a menu is relatively sparse the holographic display system enables the coherent light to be concentrated into those relatively small illuminated areas, thus facilitating a bright display even under high ambient light conditions. In embodiments the device may present menus, take orders and communicate these wirelessly to a kitchen and, optionally, may also be used to pay for a meal. In a more sophisticated device the information displayed may be a function of the date and/or time and/or user (that is customer), for example making recommendations based upon a customer identification input via the touch sensitive display to the device. In embodiments the device may communicate with a back-end database storing menu data, price data (which may be stored separately to the menu data, to facilitate price updates) loyalty information, and other information, for example advertising. Optionally additional material which may be displayed includes advertising, which may be targeted based upon stored customer data, as well as games, internet access, text or other messaging, and the like.

In some embodiments the back-end database may provide hologram data to the device for display, this hologram data compensating for distortion introduced by projection onto the display area; preferably this is color hologram data, which may be calculated by an OSPR-type procedure as previously described. Thus in embodiments of the device there is no need to generate holograms for display within the device. In other embodiments, however, the device receives image data, for example for the menus, and generates holograms, appropriately compensated for distortion, for display by the device. This approach can reduce the amount of data needed to be sent to the device for example when updating price information. The device may also receive together with the menu data, data defining touch sensitive regions of the display area and/or data defining actions to be invoked on touching the display area, for example to link from one menu to another and/or to link to one or more information pages relating to the item(s) displayed on a menu page.

The device may optionally include data defining a test pattern for projection onto the display area for calibrating the touch sensing system, for example identifying a set of fiducial points on the display area for a user to touch.

It will be recognized that providing an interactive menu for a restaurant is just one of many applications; another, for example, is the display/sharing/manipulation of user images such as photos. Thus in embodiments the device may include a system for gesture recognition for manipulating a displayed image. It will also be recognized that embodiments of the device may be configured to respond to simultaneous touching of a plurality of different positions on the display area, again to facilitate manipulation of the displayed image.

Figure 9B:
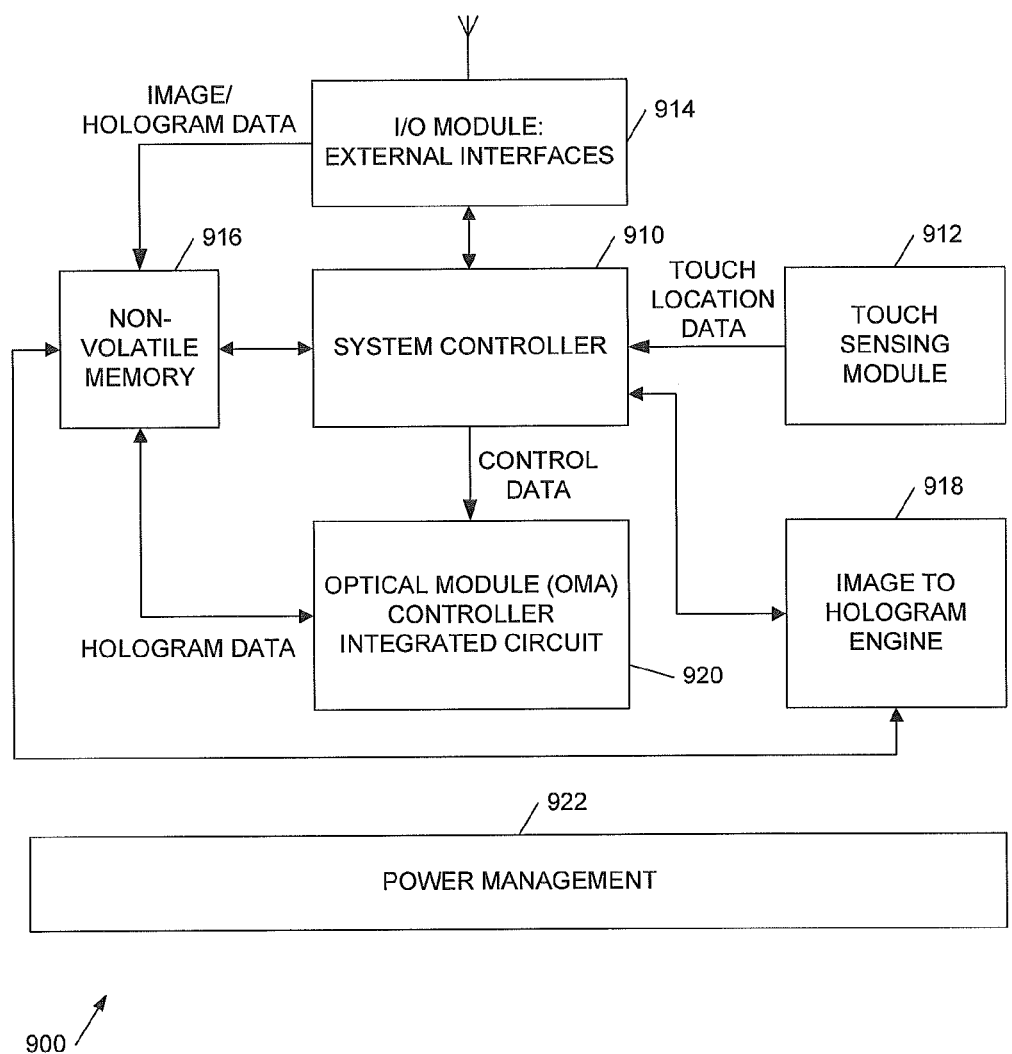

Referring now to FIG. 9b, this shows a block diagram of the device 900 of FIG. 9a, in a variant of the implementation as described above with reference to FIG. 8. Thus in FIG. 9b, a system controller 910 is coupled to a touch sensing module 912 from which it receives data defining one or more touched locations on the display area, either in rectangular or in distorted coordinates (in the latter case the system controller may perform distortion compensation). The touch sensing module 912 in embodiments comprises a CMOS sensor driver and touch-detect processing circuitry.

The system controller 910 is also coupled to an input/output module 914 which provides a plurality of external interfaces, in particular for buttons, LEDs, optionally a USB and/or Bluetooth (RTM) interface, and a bi-directional wireless communication interface, for example using WiFi (RTM) in embodiments the wireless interface may be employed to download data for display either in the form of images or in the form of hologram data, optionally price data for price updates, and in embodiments provides a backhaul link for placing orders, handshaking to enable payment and the like. Non-volatile memory 916, for example Flash RAM is provided to store data for display, including hologram data, as well as distortion compensation data, and touch sensing control data (identifying regions and associated actions/links). Non-volatile 916 is coupled to the system controller and to the I/O module 914, as well as to an optional image-to-hologram engine 918 as previously described (also coupled to system controller 910), and to an optical module controller 920 for controlling the optics shown in FIG. 2. In embodiments the optical module controller 920 receives hologram data for display and drives the hologram display SLM, as well as controlling the laser output powers in order to compensate for brightness variations caused by varying coverage of the display area by the displayed image (for more details see, for example, our WO2008/075096). In embodiments the laser power(s) is(are) controlled dependent on the "coverage" of the image, with coverage defined as the sum of: the image pixel values, preferably raised to a power of gamma (where gamma is typically 2.2). The laser power is inversely dependent on (but not necessarily inversely proportional to) the coverage; in preferred embodiments a lookup table as employed to apply a programmable transfer function between coverage and laser power. The hologram data stored in the non-volatile memory, optionally received by interface 914, therefore in embodiments comprises data defining a power level for one or each of the lasers together with each hologram to be displayed; the hologram data may define a plurality of temporal holographic subframes for a displayed image. Preferred embodiments of the device also include a power management system 922 to control battery charging, monitor power consumption, invoke a sleep mode and the like.

In operation the system controller controls loading of the image/hologram data into the non-volatile memory, where necessary conversion of image data to hologram data, and loading of the hologram data into the optical module and control of the laser intensities. The system controller also performs distortion compensation and controls which image to display when and how the device responds to different "key" presses and includes software to keep track of a state of the device. The controller is also configured to transition between states (images) on detection of touch events with coordinates in the correct range, a detected touch triggering an event such as a display of another image and hence a transition to another state. The system controller 910 also, in embodiments, manages payment, price updates of displayed menu items and the like.

In other embodiments the device may be configured to project onto a curved display surface, for example onto a translucent or transparent display surface from behind or (depending up the mechanical configuration) the inside. A similar infrared illumination and image sensing technique may be employed to detect a splash of scattered light where the display surface is touched. Thus for example in one embodiment the display surface may be part or all of a hemisphere or globe. The skilled person will recognise that the above described techniques may be adapted to such an arrangement, as described in more detail below.

Curved Display Touch-Sensitive Surfaces

Referring again to FIG. 3, an additional step may be included to multiply $g_{uv}$ by a conjugate of the distorted wavefront prior to quantisation about the real and/or imaginary axis, using wavefront correction data retrieved from non-volatile memory, to perform aberration correction for image projection onto a curved display surface (see also our WO 2008/120015). The wavefront correction data may be determined from a ray tracing simulation software package such as ZEMAX, or the wavefront may be measured, for example using a Shack-Hartman sensor (see also "Aberration correction in an adaptive free-space optical interconnect with an error diffusion algorithm", D. Gil-Leyva, B. Robertson, T. D. Wilkinson, C. J. Henderson, Applied Optics, Vol. 45, No. 16, p. 3782-3792, 1 Jun. 2006). The wavefront correction data may be represented, for example, in terms of Zernike modes.

Thus a wavefront W=exp (i$\Psi$) may be expressed as an expansion in terms of Zernike polynomials as follows:

$$W = \exp(i\Psi) = \exp\left(i\sum_j a_j Z_j\right)$$

Where $Z_j$ is a Zernike polynomial and $a_j$ is a coefficient of $Z_j$. Similarly a phase conjugation of the $\Psi_c$ of the wavefront $\Psi$ may be represented as:

$$\Psi_c = \sum_j c_j Z_j$$

For correcting the wavefront preferably $\Psi_c\sim\Psi$. Thus the corrected hologram data $g_{uv}{}^c$ can be expressed as follows:

$$g_{uv}{}^c = \exp(i\Psi_c) g_{uv}$$

The touch-sensing data can be compensated for distortion introduced by the curved surface in a broadly similar manner to that previously described above, for example by applying a polynomial correction equations or by employing an anti-distortion mapping, which may be pre-determined and stored for the display surface or determined by a user-calibration procedure.

The techniques described herein have may applications which include, but are not limited to, touch-sensitive displays for the following: mobile phone; PDA; laptop; digital camera; digital video camera; games console; in-car cinema; navigation systems (in-car or personal e.g. wristwatch GPS); head-up and helmet-mounted displays eg. for automobiles and aviation; watch; personal media player (e.g. photo/video viewer/player, MP3 player, personal video player); dashboard mounted display; laser light show box; personal video projector (a "video iPod (RTM)" concept); advertising and signage systems; computer (including desktop); remote control unit; an architectural fixture incorporating a holographic image display system; more generally any device where it is desirable to share pictures and/or for more than one person at once to view an image.

No doubt many other effective alternatives will occur to the skilled person. It will be understood that the invention is not limited to the described embodiments and encompasses modifications apparent to those skilled in the art lying within the spirit and scope of the claims appended hereto.

In conclusion, the invention provides novel systems, devices, methods and arrangements for display. While detailed descriptions of one or more embodiments of the invention have been given above, no doubt many other effective alternatives will occur to the skilled person. It will be understood that the invention is not limited to the described embodiments and encompasses modifications apparent to those skilled in the art lying within the spirit and scope of the claims appended hereto.

What is claimed is:

1. A touch sensitive image display device for projecting a touch sensitive displayed image at an acute angle onto a surface, the device comprising:
   image projection optics comprising at least one light source;
   a remote touch sensing system to remotely detect a touch of a location within or adjacent to said displayed image and having a touch data output; and
   a control system having a first input coupled to said touch data output to receive data from said remote touch sensing system, wherein said control system is configured to control said device responsive to remote detection of a touch of a said location within or adjacent to said displayed image; and
   wherein the device further comprises:
   a device data input to receive data defining an image for display;
   wherein said image projection optics comprises a spatial light modulator (SLM) illuminated by said light source and output optics to project modulated light from said SLM onto said surface at said acute angle;
   wherein said control system includes memory for storing said data defining said image for display and has a second input coupled to receive said data defining said image for display and an output for driving said SLM to display data on said SLM to replay said displayed image on said surface; and
   wherein said remote touch sensing system further comprises a touch imaging sensor, and a system to:
   input touch location data from said touch imaging sensor for identifying said detected touch of a location;
   apply anti-distortion processing to convert said touch location data to rectangular x-y co-ordinates to provide anti-distorted detected touch data in said rectangular x-y co-ordinates; and
   provide said anti-distorted detected touch data to said touch data output for input to said control system.

2. The touch sensitive image display device as claimed in claim 1, wherein said data defining said image for display comprises data for display on said SLM to replay a target image distorted to compensate for projection onto said surface at said acute angle.

3. A touch sensitive image display device as claimed in claim 2, wherein said touch sensitive image display device is a holographic touch sensitive image display device, wherein said image projection optics are holographic image projection optics, wherein said light source is a coherent light source, and wherein said data defining said image for display comprises hologram data defining at least one hologram for display on said SLM.

4. A touch sensitive image display device as claimed in claim 3, wherein said hologram data defines a plurality of, temporal holographic subframes each for display on said SLM, each encoding said image for display, and wherein said control system is configured to display said temporal holographic subframes in rapid succession such that the corresponding replayed images average in an observer's eye to give the impression of a reduced-noise displayed image.

5. A touch sensitive image display device as claimed in claim 1, wherein said data defining said image for display comprises image data, the device further comprising a processor configured to:
   input said image data;
   convert said input image data to target image data;
   generate, from said target image data, data for display on said spatial light modulator to reproduce a target image corresponding to said target image data; and
   output said data for said spatial light modulator; and
   wherein said target image is distorted to compensate for said projection at an acute angle to form said displayed image.

6. A touch sensitive image display device as claimed in claim 5, wherein said conversion of said input image data to said target image data comprises mapping pixels of said target image data to pixels of said input image data and looking up values for said pixels of said target image data in said input image data.

7. A touch sensitive image display device as claimed in claim 5, wherein said conversion of said input image data to said target image data comprises mapping pixels of said input image data to pixels of said target image data such that a plurality of pixels of said target image data have values dependent on a single pixel of said input image data; and additionally or alternatively such that a single pixel of said target image data has a value dependent on values of a plurality of pixels of said input image data.

8. A touch sensitive image display device as claimed in claim 5, wherein said conversion of said input image data to said target image data further comprises compensating for variations in per unit area brightness of said image due to said acute angle protection.

9. A touch sensitive image display device as claimed in claim 5, wherein said projected image comprises a multicolor image, wherein said illumination system comprises a multicolor illumination system, wherein said conversion of said input image data to said target image data comprises compensating for different scaling of different color components of said multicolor projected image due to said projection.

10. A touch sensitive image display device as claimed in claim 9, wherein said compensating further comprises compensating for different aberrations of said different color components by spatial mapping of said aberrations for a said color component.

11. A touch sensitive image display device as claimed in claim 5, wherein said processor is configured to generate, from said target image data, data for display by omitting to process portions of target image space in which said target image data is located from which data for said image is absent.

12. A touch sensitive image display device as claimed in claim 5, wherein said processor is configured to generate a plurality of temporal holographic subframes for display in rapid succession said that corresponding temporal subframe images average in an observer's eye to give the impression of a reduced-noise displayed image.

13. A touch sensitive image display device as claimed in claim 1, wherein said acute angle is less than 65°, 50° or 45°.

14. A touch sensitive image display device as claimed in claim 1, wherein said remote touch sensing system comprises an optical remote touch sensing system.

15. A touch sensitive image display device as claimed in claim 14, wherein said optical remote touch sensing system shares part of said image projection optics.

16. A touch sensitive image display device as claimed in claim 14, wherein said optical remote touch sensing system comprises infrared illumination optics to provide illumination in a region above said surface on which said image is displayed, and location sensing optics to detect light from touching said displayed image through said illuminated region.

17. A touch sensitive image display device as claimed in claim 16, wherein said illuminated region comprises a sheet above said surface and wherein said location sensing optics is configured to detect scattered light from said sheet.

18. A touch sensitive image display device as claimed in claim 16, wherein said location sensing optics comprises a sensor for optical time-of-flight ranging.

19. A touch sensitive image display device as claimed in claim 1, where said remote touch sensing system comprises an acoustic touch sensing system.

20. A touch sensitive image display device as claimed in claim 1, wherein said detected touch data comprises location data identifying a position of a detected touch on displayed image, and wherein said remote touch sensing system includes a system to compensate for keystone distortion of said position of said detected touch in relation to said displayed image arising from said acute angle projection.

21. A touch sensitive image display device as claimed in claim 1, wherein said control system is further configured to display a calibration image to enable a user to calibrate positions of one or more touch sensitive locations on said displayed image to compensate for variable keystone distortion of said displayed image.

22. A touch sensitive image display device as claimed in claim 1, wherein said spatial light modulator is a reflective spatial light modulator (SLM).

23. A touch sensitive image display device as claimed in claim 22, wherein said projection optics defines two antiparallel optical paths for said light, one towards and one away from said reflective SLM via a shared beamsplitter.

24. A touch sensitive image display device as claimed in claim 1, wherein said output optics comprises an off-axis lens.

25. A touch sensitive image display device as claimed in claim 1, wherein said projection optics is configured to form an intermediate image at an intermediate image surface, said intermediate image corresponding to a distorted version of said displayed imaged, and wherein said projection optics further comprises a diffuser located at said intermediate image surface and an actuator mechanically coupled to said diffuser.

26. A touch sensitive image display device as claimed in claim 25, wherein said diffuser comprises a pixellated, quantised phase diffuser.

27. A touch sensitive image display device as claimed in claim 1, wherein said control system is configured to change said displayed image responsive to said remote detection of a touch.

28. A touch sensitive image display device as claimed in claim 1, wherein said control system is configured to send a wireless message to a remote computer system image responsive to said remote detection of a touch.

29. A restaurant menu display and food ordering device comprising a touch sensitive image display device as recited in claim 1, wherein said memory stores data for a plurality of menus for display together with menu link data defining links between the menus, and price data, and further comprising a bidirectional communications link for receiving said price data and for transmitting a customer order, wherein said system controller is configured to display selected said menus response to a said customer touching menu link regions of said displayed menus, a said menu link region being associated with said link data to define selected menu to display in response to detection of touching of a said link region, and to input an order for one or both of food and drink by detection of said customer touching one or more touch sensitive order regions of a said menu displayed by the display device, and to transmit said order to a remote computer system for output for fulfilling the order.

30. A restaurant menu display and food ordering device as claimed in claim 29 further comprising means for a customer to identify themselves to said remote computer system using the device, and means to receive and display customer-specific data for said identified customer.

31. A touch sensitive image display device as claimed in claim 1, wherein said remote touch sensing system further comprises a system to determine an action responsive to said anti-distorted touch data.

\* \* \* \* \*